US012579663B2

(12) United States Patent
Jiang et al.

(10) Patent No.: US 12,579,663 B2
(45) Date of Patent: Mar. 17, 2026

(54) MULTI-TARGET TRACKING METHOD BASED ON FEATURE DECOUPLING WITH JOINT DETECTION AND FEATURE RE-IDENTIFICATION

(71) Applicant: Civil Aviation University of China, Tianjin (CN)

(72) Inventors: Laiwei Jiang, Tianjin (CN); Ce Wang, Tianjin (CN)

( * ) Notice: Subject to any disclaimer, the term of this patent is extended or adjusted under 35 U.S.C. 154(b) by 0 days.

(21) Appl. No.: 18/986,684

(22) Filed: Dec. 18, 2024

(65) Prior Publication Data

US 2026/0044966 A1 Feb. 12, 2026

(30) Foreign Application Priority Data

Aug. 7, 2024 (CN) .......................... 202411077878.5

(51) Int. Cl.
*G06T 7/246* (2017.01)
*G06T 7/277* (2017.01)
(Continued)

(52) U.S. Cl.
CPC .............. *G06T 7/248* (2017.01); *G06T 7/277* (2017.01); *G06V 10/25* (2022.01); *G06V 10/761* (2022.01);
(Continued)

(58) Field of Classification Search
None
See application file for complete search history.

(56) References Cited

U.S. PATENT DOCUMENTS

| 10,936,902 B1* | 3/2021 | Bagwell | ..................... G06T 7/73 |
| 2023/0055783 A1* | 2/2023 | Liu | ........................... G06T 7/248 |
| 2024/0012146 A1* | 1/2024 | Wang | .................... G01S 7/4802 |

FOREIGN PATENT DOCUMENTS

| CN | 114241007 A | 3/2022 |
| CN | 114529578 A | 5/2022 |

(Continued)

OTHER PUBLICATIONS

Qingqing Qu, Wenge Zhang, Gang Li, 'The object tracking in the multiple cameras surveillance system based on the color transferring', Machine Design and Manufacturing Engineering, Sep. 15, 2016, pp. 42-46, vol. 45 No. 9.

*Primary Examiner* — Leon Viet Q Nguyen
(74) *Attorney, Agent, or Firm* — Novoclaims Patent Services LLC; Mei Lin Wong

(57) ABSTRACT

A multi-target tracking method with joint detection and re-identification based on feature decoupling in the field of multi-target tracking for solving low tracking accuracy problem caused by conflicts in optimization directions in the joint training process of detection and re-identification tasks and improving tracking performance, includes the steps of: preprocessing multi-target tracking dataset, extracting feature F from the processed images and labels by the backbone network; decoupling feature F in the channel and spatial dimensions to obtain feature $F_{det}$ suitable for detection tasks and feature $F_{id}$ suitable for re-identification tasks respectively, obtaining the position of the target detection bounding box in the image based on $F_{det}$ subdivision detection branch; calculating the similarity matrix D based on $F_{id}$ and IOU overlap level, and processing matching of the target detection bounding box in the image with the trajectory already existed by using D and Hungarian algorithm to finally obtain the tracking result.

17 Claims, 4 Drawing Sheets

A: Heat Map Sub-Branch
B: Center Point Offset Sub-Branch
C: Bounding Box Size Sub-Branch

(51) Int. Cl.

| | | |
|---|---|---|
| *G06V 10/25* | (2022.01) | |
| *G06V 10/74* | (2022.01) | |
| *G06V 10/77* | (2022.01) | |
| *G06V 10/82* | (2022.01) | |
| *G06V 20/40* | (2022.01) | |

(52) U.S. Cl.
CPC .......... *G06V 10/7715* (2022.01); *G06V 10/82* (2022.01); *G06V 20/46* (2022.01); *G06V 20/49* (2022.01); *G06T 2207/10016* (2013.01); *G06T 2207/20084* (2013.01); *G06T 2207/30241* (2013.01)

(56) References Cited

FOREIGN PATENT DOCUMENTS

| CN | 114663861 A | 6/2022 |
|---|---|---|
| CN | 115272404 A | 11/2022 |
| CN | 117437260 A | 1/2024 |

* cited by examiner

MULTI-TARGET TRACKING METHOD BASED ON FEATURE DECOUPLING WITH JOINT DETECTION AND FEATURE RE-IDENTIFICATION

CROSS REFERENCE OF RELATED APPLICATION

This is a non-provisional application that claims priority to Chinese application number 2024110778785, filing date Aug. 7, 2024, the entire contents of each of which are expressly incorporated herein by reference.

BACKGROUND OF THE PRESENT INVENTION

Field of Invention

The present invention relates to the field of multi-target tracking technology, and is in particular related to a joint detection and re-identification multi-target tracking method based on feature decoupling.

Description of Related Arts

Multi-target tracking is an important research direction in the field of computer vision, and its main task is to accurately detect in real time the positions of each of the multiple targets in a continuous video sequence, then assign a unique number to each target, and connect targets with the same number in consecutive video frames to form a track. Multi-target tracking can serve as the basis for a variety of downstream tasks, including but not limited to video surveillance analysis, autonomous driving, and human-computer interaction, etc., and provide information such as target location and trajectory for higher-level visual understanding and decision making.

Multi-target tracking technology is widely used, but there are many challenges to achieve accurate multi-target tracking. First, the number of targets is uncertain and may change over time. Second, poor tracking performance may be caused by mutual occlusion between targets, background interference, and lighting changes, which in turn affects the tracking performance. Finally, the complexity of target motion patterns and the similarity between targets also increase the difficulty of multi-target tracking.

In order to address the above challenges, researchers proposed applying deep learning technology to multi-target tracking. The advantage of deep learning technology is that it can automatically learn useful features from a large amount of data without manual design and selection. This enables deep learning technology to overcome the above-mentioned challenges to a certain extent when dealing with multi-target tracking problems. In multi-target tracking based on deep learning, the multi-target tracking algorithms are divided into two categories: detection-based tracking and joint detection tracking, depending on whether the detection and tracking stages are independent.

Detection-based tracking first uses a detector to mark the target of interest in each image with a rectangular box. The tracker then uses the output of the detector to extract the target's appearance, motion and other features again, and calculates the similarity between the existing trajectory in the previous frame to associate the detected target with the trajectory. However, this method requires two computationally intensive components, the detector and the tracker. In order to reduce the complexity of the calculation, some researchers have tried to fuse and optimize the neural network in the detection phase and the neural network used to extract the target's appearance features in the tracking phase.

The target tracking method based on JDE innovatively integrates the target detection link and the appearance feature extraction link into one network, and introduces the feature pyramid network in the detection stage, which greatly improves the reasoning speed of the multi-target tracking method. However, object detection and re-identification are essentially two different tasks. The detection task focuses more on the location of the object in the image and the category of the object, and pays more attention to global features and deeper semantic information. On the other hand, the re-identification task does not require object positioning, and mainly distinguishes different objects of the same category based on the appearance features of the target. This process pays more attention to the fine-grained features of the object. Therefore, there is a conflict in the optimization direction of the target detection task and the re-identification task during the training process. Directly using the features extracted by the same backbone network for target detection and re-identification will reduce the overall tracking accuracy.

SUMMARY OF THE PRESENT INVENTION

In order to solve the problem that the existing joint detection and re-identification multi-target tracking methods still have conflicts in the optimization directions of the detection task and the re-identification task during the training process, resulting in low tracking accuracy, the present invention provides a multi-target tracking method with joint detection and re-identification features based on feature decoupling.

A multi-target tracking method with joint detection and re-identification based on feature decoupling includes the following steps:

Step 1: obtaining an i-th frame image of a video sequence to be tracked, and cropping the i-th frame image to a predetermined size to obtain an i-th frame target image to be detected;

Step 2: Step 2: inputting the i-th frame target image to be detected into a multi-target tracking model, and obtaining a center point coordinates $$\left(\hat{x}_{k'}^i, \hat{y}_{k'}^i\right)$$

of a k'-th target detection bounding box in the i-th frame target image to be detected, a width and height $$\left(\hat{w}_{k'}^i, \hat{h}_{k'}^i\right)$$

of the target detection bounding box, an offset $$\left(\delta\hat{x}_{k'}^i, \delta\hat{y}_{k'}^i\right)$$

of the center point coordinates of the target detection bounding box, and a target identity vector $L^i(k')$;

wherein $k' \in [1, K']$, $K'$ is a total number of targets in the i-th frame target image;

Step 3: by using $$\left(\hat{x}_{k'}^i, \hat{y}_{k'}^i\right), \left(\hat{w}_{k'}^i, \hat{h}_{k'}^i\right), \text{and } \left(\delta\hat{x}_{k'}^i, \delta\hat{y}_{k'}^i\right)$$

obtained from step 2, obtaining a position of the k'-th target detection bounding box in the i-th frame target image to be detected:

$$\left(\hat{x}_{k'}^i + 4\delta\hat{x}_{k'}^i - \hat{w}_{k'}^i/2, \hat{y}_{k'}^i + 4\delta\hat{y}_{k'}^i - \hat{h}_{k'}^i/2,\right.$$
$$\left.\hat{x}_{k'}^i + 4\delta\hat{x}_{k'}^i + \hat{w}_{k'}^i/2, \hat{y}_{k'}^i + 4\delta\hat{y}_{k'}^i - \hat{h}_{k'}^i/2\right);$$

Step 4: judging whether i is equal to 1, if i=1, initializing all targets in the i-th frame target image to be detected as new trajectories, and using the target identity vector of the target as a feature of a corresponding trajectory, then letting i=i+1, and returning to step 1; if i≠1, continuing to process step 5;

Step 5: obtaining the target prediction bounding box position in the i-th frame target image to be detected by using the Kalman filter algorithm and the target detection bounding box position in the i-th frame target image; then obtaining the similarity matrix D between the target in the i-th frame target image to be detected and the trajectory already existed in the i-th frame target image by using the target prediction bounding box position in the i-th frame target image to be detected, the target detection bounding box position in the i-th frame target image to be detected, the target identity vector of each target in the i-th frame target image to be detected, and the target identity vectors representing different existing trajectories in the i−1 th frame;

Step 6: performing a first matching between the target detection bounding box in the i-th frame target image to be detected and the existing trajectories in the i−1 th frame target image by taking D as a matching cost matrix and using the Hungarian algorithm and the matching cost matrix; then performing a second matching by using IOU overlap threshold on the target detection bounding box of the i-th frame target image to be detected that is unmatched in the first matching and the target prediction bounding box corresponding to each unmatched trajectory in the i−1 th frame; lastly, labelling the unmatched trajectories as unmatched, defining that the target corresponding to the trajectory that has not been matched for z consecutive frames as disappeared and deleting the existing trajectories of the disappeared target;

wherein z is a positive integer;

the step of performing a second matching by using IOU overlap threshold on the target detection bounding box of the i-th frame target image to be detected that is unmatched in the first matching and the target prediction bounding box corresponding to each unmatched trajectory in the i−1 th frame, specifically:

obtaining an IOU value C of the target detection bounding box of the i-th frame target image to be detected that is unmatched in the first matching and the target prediction bounding box corresponding to each unmatched trajectory in the i−1 th frame, matching is successful if C is greater than the IOU overlap threshold, and matching is not successful if C is smaller than the IOU overlap threshold;

Step 7: determining whether i is equal to I, if i=I, output the trajectory successfully matched in step 6, if i<I, let i=i+1 and returning to step 1, wherein I is the total number of frames in the video sequence to be tracked.

Furthermore, in step 5, the similarity matrix D refers to:

$$D = \lambda D_r + (1 - \lambda)D_m;$$

wherein $D_r$ is a matrix composed of a cosine distances between the identity vectors of different targets in the i-th frame target image to be detected and the target identity vector representing different trajectories in the i−1 th frame target image, λ is the weight parameter, and $D_m$ is a matrix composed of Mahalanobis distances between the prediction bounding box positions of different targets in the i-th frame target image to be detected and the detection bounding box positions of different targets in the i-th frame target image.

Furthermore, the multi-target tracking model in step 2 is obtained by the steps of:

S1: preprocessing a MOT17 dataset to obtain a preprocessed MOT17 dataset, specifically:

S101: preprocessing images in the MOT17 dataset:

cropping each frame of target image in the MOT17 dataset to a uniform size, and then carrying out data enhancement processing of the target image to obtain a preprocessed target image;

wherein the data enhancement processing comprises random rotation, scaling and flipping operations;

the MOT17 dataset comprises a training set and a test set;

the MOT17 dataset comprises: every frame of the target image and an image label of the target image in the tracking target video;

the image label in the MOT17 dataset comprises: an identity ID of each target in every frame of the target image and top left corner coordinates and bottom right corner coordinates of each target detection bounding box;

S102: preprocessing the image labels in the MOT17 dataset to obtain preprocessed image labels:

first, obtaining coordinates of the center point of the target detection bounding box $$\left(c_{k,x}^t, c_{k,y}^t\right) = \left(\frac{x_{k,1}^t + x_{k,2}^t}{2}, \frac{y_{k,1}^t + y_{k,2}^t}{2}\right)$$

by using the coordinates of the top left corner box and bottom right corner of each target detection bounding box;

wherein $$\left(x_{k,1}^t, y_{k,1}^t\right)$$

refers to the top left corner coordinates of the k-th target detection bounding box in the t-th frame target image, $$\left(x_{k,2}^{t}, y_{k,2}^{t}\right)$$

refers to the bottom right coordinates of the k-th target detection bounding box in the t-th frame target image; then, obtaining width and height $$\left(x_{k,2}^{t} - x_{k,1}^{t}, y_{k,2}^{t} - y_{k,1}^{t}\right)$$

of the target detection bounding box; then, obtaining width and height $$\left(x_{k,2}^{t} - x_{k,1}^{t}, y_{k,2}^{t} - y_{k,1}^{t}\right)$$

of the target detection bounding box; wherein $$x_{k,2}^{t} - x_{k,1}^{t}$$

refers to the width of the k-th target detection bounding box in the t-th frame target image, $$y_{k,2}^{t} - y_{k,1}^{t}$$

refers to the height of the k-th target detection bounding box in the t-th frame target image;
then, obtaining the target identity vector $L^{t}(k)$ by processing one-hot vector encoding of the identity ID of the k-th target in the target image of the t-th frame;
then, obtaining an offset of the center point of the k-th target detection bounding box in the t-th frame target image on a feature map, wherein the offset refers to:

$$o_{k}^{t} = \left(\frac{c_{k,x}^{t}}{4} - \left\lfloor \frac{c_{k,x}^{t}}{4} \right\rfloor, \frac{c_{k,y}^{t}}{4} - \left\lfloor \frac{c_{k,y}^{t}}{4} \right\rfloor\right);$$

finally, using the coordinates of the center point of the target detection bounding box, the width and height of the target detection bounding box, the target identity vector, and the offset of the center point of the target detection bounding box on the feature map as the preprocessed image labels;
S103: forming a preprocessed MOT17 dataset by using the preprocessed image labels and the preprocessed images:
the preprocessed MOT17 dataset comprises: a preprocessed training set and a preprocessed test set;
S2: training and testing the multi-target tracking network by using the preprocessed MOT17 dataset to obtain the multi-target tracking model.
Furthermore, the multi-target tracking network in S2 comprises: a backbone network module, a feature decoupling module, a target detection branch module, and a re-identification branch module;
the backbone network module is a DLA-34 network, which is used to obtain a feature F of the t-th frame target image;

the feature decoupling module comprises a channel decoupling unit and a spatial decoupling unit;
the channel decoupling unit is arranged to decouple the feature F in a channel dimension, and obtain a feature $F_{c\_det}$ for the detection branch after channel decoupling and the feature $F_{c\_id}$ for the re-identification branch after channel decoupling;
the spatial decoupling unit is used to decouple $F_{c\_det}$ and $F_{c\_id}$ in the spatial dimension respectively to obtain spatially decoupled features for detection branches $F_{det}$ and spatially decoupled features for re-identification the branches $F_{id}$;
the target detection branch module comprises: a heat map sub-branch unit, a bounding box size sub-branch unit, and a center point offset sub-branch unit;
the heat map sub-branch unit comprises a seventh convolution sub-unit $Conv_5$;
the $Conv_5$ is used to adjust a dimension of the feature $F_{det}$ and generate the center point coordinates of the target detection bounding box;
the $Conv_5$ comprises: a 21st convolution layer of a 3×3 convolution kernel, a first ReLU activation function layer, and a 22nd convolution layer of a 1×1 convolution kernel;
the center point offset sub-branch unit comprises an eighth convolution sub-unit $Conv_6$;
the eighth convolution sub-unit $Conv_6$ is used to adjust the dimension of the feature $F_{det}$ to generate the offset of the center point of the target detection bounding box;
the eighth convolution sub-unit $Conv_6$ comprises: a 23rd convolution layer of the 3×3 convolution kernel, a ReLU activation function layer, and a 24th convolution layer of the 1×1 convolution kernel;
the bounding box size sub-branch unit comprises a ninth convolution sub-unit $Conv_7$;
the ninth convolution sub-unit $Conv_7$ is used to adjust the dimension of the feature $F_{det}$ to generate the width and height of the target detection bounding box;
the ninth convolution sub-unit $Conv_7$ comprises: a 25th convolution layer of the 3×3 convolution kernel, a ReLU activation function layer, and a 26th convolution layer of the 1×1 convolution kernel;
the re-identification branch module uses the feature $F_{id}$ to obtain every target identity vector in the target image;
the re-identification branch module comprises a tenth convolution sub-unit $Conv_8$;
the $Conv_8$ is used to adjust the dimension of $F_{id}$ to generate the target identity vector;
the tenth convolution subunit $Conv_8$ comprises: a 27th convolution layer of the 3×3 convolution kernel, a ReLU activation function layer, and a 28th convolution layer of the 1×1 convolution kernel.
Furthermore, the channel decoupling unit comprises: a maximum pooling layer sub-unit, an average pooling layer sub-unit, a first convolution sub-unit $Conv_1$, a second convolution sub-unit $Conv_2$, a first element summation sub-unit, a second element summation sub-unit, a first residual link sub-unit, and a second residual link sub-unit;
the maximum pooling layer sub-unit is arranged to perform a maximum pooling operation on the feature F;
the average pooling layer sub-unit is arranged to perform an average pooling operation on the feature F;
the first convolution sub-unit $Conv_1$ comprises: a 1st convolution layer, a 2nd convolution layer, and a ReLU activation function;

the first convolution sub-unit $Conv_1$ is arranged to aggregate the channel information of the detection task of the feature F after maximum pooling and average pooling;

the second convolution sub-unit $Conv_2$ comprises: a 3rd convolution layer, a 4th convolution layer, and a ReLU activation function;

the second convolution sub-unit $Conv_2$ is arranged to aggregate the channel information of the feature F after maximum pooling and average pooling for the re-identification task;

the first element summation sub-unit is arranged to sum, element by element, the features output by the first convolutional layer sub-unit and to process through the Sigmoid activation function to obtain a detection branch channel attention weight $C_{det}$;

the second element summation sub-unit is arranged to sum, element by element, the features output by the second convolutional layer sub-unit and to process through the Sigmoid activation function to obtain a re-identification branch channel attention weight $C_{id}$;

the first residual link sub-unit is arranged to multiply $C_{det}$ by the feature F and add the feature F to obtain a detection branch feature $F_{c\_det}$;

the second residual link sub-unit is arranged to multiply $C_{id}$ by the feature F and add the feature F to obtain a re-identification branch feature $F_{c\_id}$.

Furthermore, the feature $F_{c\_det}$ for the detection branch after channel decoupling and the feature $F_{c\_id}$ for the re-identification branch after channel decoupling are:

$$F_{c\_det} = F * C_{det} + F;$$

$$F_{c\_id} = F * C_{id} + F;$$

$$C_{det} = \sigma(Conv_1(AvgPool(F)) + Conv_1(MaxPool(F)));$$

$$C_{id} = \sigma(Conv_2(AvgPool(F)) + Conv_2(MaxPool(F)));$$

wherein $C_{det}$ is the detection branch channel attention weight, $C_{id}$ is the re-identification branch channel attention weight, $F_{c\_det}$ is the channel decoupled feature to be used for the detection branch, $F_{c\_id}$ is the channel decoupled feature to be used for the re-identification branch, $\sigma$ is the Sigmoid activation function, $Conv_1$ is the first convolution sub-unit, $Conv_2$ is the second convolution sub-unit, AvgPool( ) is the average pooling operation, and MaxPool( ) is the maximum pooling operation.

Furthermore, the spatial decoupling unit comprises a third convolution sub-unit $Conv_3$, a fourth convolution sub-unit $Conv_4$, a fifth convolution sub-unit, a sixth convolution sub-unit, a third element summation sub-unit, a fourth element summation sub-unit, a third residual link sub-unit, and a fourth residual link sub-unit;

the third convolution sub-unit $Conv_3$ comprises a 5th convolution layer of the 1×1 convolution kernel; a GELU activation function, and an input of the third convolution layer sub-unit as the feature $F_{c\_det}$;

the fourth convolution sub-unit $Conv_4$ comprises a 6th convolution layer of the 1×1 convolution kernel; a GELU activation function, and an input of the fourth convolution layer sub-unit as the feature $F_{c\_id}$;

the fifth convolution sub-unit comprises a first convolution block $Conv2d_0$, a second convolution block $Conv2d_1$, a third convolution block $Conv2d_2$, and a fourth convolution block $Conv2d_3$; an input of the fifth convolution sub-unit is an output of the third convolution sub-unit;

the first convolution block $Conv2d_0$ is a 7th convolution layer of a 5×5 convolution kernel; an input of the first convolution block is an output of the third convolution sub-unit;

the second convolution block $Conv2d_1$ comprises a 8th convolution layer of a 1×7 convolution kernel and a 9th convolution layer of a 7×1 convolution kernel, wherein an output of the 8th convolution layer is an input of the 9th convolution layer;

the third convolution block $Conv2d_2$ comprises a 10th convolution layer of a 1×11 convolution kernel and a 11th convolution layer of a 11×1 convolution kernel, wherein an output of the 10th convolution layer is an input of the 11th convolution layer;

the fourth convolution block $Conv2d_3$ comprises a 12th convolution layer of a 1×21 convolution kernel and a 13th convolution layer of a 21×1 convolution kernel, wherein an output of the 12th convolution layer is an input of the 13th convolution layer;

the inputs of the second convolution block $Conv2d_1$, the third convolution block $Conv2d_2$, and the fourth convolution block $Conv2d_3$ are all output of the first convolution block $Conv2d_0$, the sixth convolution sub-unit comprises a fifth convolution block $Conv2d'_0$, a sixth convolution block $Conv2d'_1$, a seventh convolution block $Conv2d'_2$, and an eighth convolution block $Conv2d'_3$; an input of the sixth convolution sub-unit is an output of the fourth convolution sub-unit;

the fifth convolution block $Conv2d'_0$ is a 14th convolution layer of a 5×5 convolution kernel; an input of the fifth convolution block is an output of the fourth convolution sub-unit;

the sixth convolution block $Conv2d'_1$ comprises a 15th convolution layer of a 1×3 convolution kernel and a 16th convolution layer of a 3×1 convolution kernel, wherein an output of the 15th convolution layer is an input of the 16th convolution layer;

the seventh convolution block $Conv2d'_2$ comprises a 17th convolution layer of a 1×5 convolution kernel and a 18th convolution layer of a 5×1 convolution kernel, wherein an output of the 17th convolution layer is an input of the 18th convolution layer;

the eighth convolution block $Conv2d'_3$ comprises a 19th convolution layer of a 1×9 convolution kernel and a 20th convolution layer of a 9×1 convolution kernel, wherein an output of the 19th convolution layer is an input of the 20th convolution layer;

the inputs of the sixth convolution block $Conv2d'_1$, and the seventh convolution block $Conv2d'_2$ and the eighth convolution block $Conv2d'_3$ are all output of the fifth convolution block $Conv2d'_0$, the third element summation sub-unit is arranged to sum, element by element, the features output by the first convolution block $Conv2d_0$, the second convolution block $Conv2d_1$, the third convolution block $Conv2d_2$, and the fourth convolution block $Conv2d_3$ and the summation result is activated by the Sigmoid function to obtain a spatial attention weight $S_{det}$ of the spatial decoupling detection branch;

the fourth element summation sub-unit is arranged to sum, element by element, the features output by the fifth convolution block $Conv2d'_0$, the sixth convolution block $Conv2d'_1$, the seventh convolution block Conv2d'$_2$ and the eighth convolution block Conv2d'$_3$ and the summation result is activated by the Sigmoid function to obtain a spatial attention weight $S_{id}$ of the spatial decoupling re-identification branch;

the third residual link sub-unit is arranged to multiply $S_{det}$ by the feature $F_{c\_det}$ and the feature $F_{c\_det}$ is added to obtain a feature $F_{det}$ for the detection branch after spatial decoupling; and the fourth residual link sub-unit is arranged to multiply $S_{id}$ by the feature $F_{c\_id}$ and the feature $F_{c\_id}$ is added to obtain a feature $F_{id}$ for the re-identification branch after spatial decoupling.

Furthermore, the feature $F_{det}$ for the detection branch after spatial decoupling and the feature $F_{id}$ for the re-identification branch after spatial decoupling are obtained based on:

$$F_{det} = F_{c\_det} * S_{det} + F_{c\_det};$$

$$F_{id} = F_{c\_id} * S_{id} + F_{c\_id};$$

$$S_{det} = \sigma\left(Conv2d_0(Conv3(F_{c\_det})) + \sum_{l=1}^{3} Conv2d_l(Conv2d_0(Conv3(F_{c\_det})))\right);$$

$$S_{id} = \sigma\left(Conv2d'_0(Conv4(F_{c\_id})) + \sum_{l'=1}^{3} Conv2d'_{l'}(Conv2d'_0(Conv4(F_{c\_id})))\right);$$

wherein $F_{c\_det}$ is the feature of the detection branch after channel decoupling, $F_{c\_id}$ is the feature of the re-identification branch after channel decoupling, $S_{det}$ is the spatial attention weight of the spatial decoupling detection branch, $S_{id}$ is the spatial attention weight of the spatial decoupling re-identification branch, $F_{det}$ is the feature of the detection branch after spatial decoupling, $F_{id}$ is the feature of the re-identification branch after spatial decoupling, $Conv2d_0(\ )$ is the first convolution block, $l$ and $l'$ are integers from 1 to 3, $Conv2d_l(\ )$ is the second convolution block, the third convolution block or the fourth convolution block; $Conv2d'_0(\ )$ is the fifth convolution block, $Conv2d'_{l'}(\ )$ is the sixth convolution block, the seventh convolution block or the eighth convolution block.

Furthermore, the total loss function $L_{total}$ used in the training of the detection branch module and the re-identification branch module is specifically:

$$L_{total} = \frac{1}{2}(e^{-w_1}(L_{heat} + L_{box}) + e^{-w_1}L_{id} + w_1 + w_2);$$

$$L_{id} = -\sum_{k=1}^{K}\sum_{m=1}^{M} L^k(m)\log(p(m));$$

$$L_{box} = \sum_{k=1}^{K}\left(\left|o_k^t - \hat{o}_k^t\right| + \lambda_s\left|s_k^t - \hat{s}_k^t\right|\right);$$

$$L_{heat} = -\frac{1}{K}\sum_{x'y'}\begin{cases}(1 - \hat{M}_{x'y'})^\alpha\log(\hat{M}_{x'y'}) & M_{x'y'} = 1; \\ (1 - M_{x'y'})^\beta(\hat{M}_{x'y'})^\alpha\log(1 - \hat{M}_{x'y'}) & M_{x'y'} \neq 1,\end{cases}$$

wherein $L_{heat}$ is the loss function of the heat map sub-branch unit, $L_{id}$ is the loss function of the re-identification branch module, $L_{box}$ is the loss function of the center point offset sub-branch unit and the bounding box size sub-branch unit, $w_1$ and $w_2$ are learnable parameters, $k$ is the target label in the t-th frame target image, $K$ is the total number of targets in the t-th frame target image, $M$ is the total number of target identity categories in the training set, $m$ is the label of the target identity category in the training set, $L^k(m)$ is the k-th target identity vector in the t-th frame target image, $p(m)$ is the target identity category distribution vector predicted by the re-identification branch module, $o_k^t$ is the true offset of the center point of the k-th target detection bounding box of the t-th frame target image, $\hat{o}_k^t$ is the predicted offset of the center point of the k-th target detection bounding box of the t-th frame target image, $\lambda_s$ is a preset constant, $$s_k^t$$

is the true size of the k-th target detection bounding box of the t-th frame target image, $$\hat{s}_k^t$$

is the predicted size of the k-th target detection bounding box of the t-th frame target image, (x', y') is a point in the heat map of $F_{det}$, $\hat{M}_{x'y'}$ is the heat map value corresponding to the midpoint (x', y') in the heat map of $F_{det}$ predicted by the heat map sub-branch unit, $M_{x'y'}$ is the heat map value corresponding to the midpoint (x', y') in the heat map of $F_{det}$, and $\alpha$ and $\beta$ are preset hyperparameters.

Furthermore, the heat map value $M_{x'y'}$ is specifically:

$$M_{x'y'} = \sum_{k=1}^{K}\exp\left\{-\frac{(x' - \bar{c}_{k,x}^t)^2 + (y' - \bar{c}_{k,y}^t)^2}{2\sigma_c^2}\right\};$$

wherein $\sigma_c$ is a target cale adaptation standard deviation, $$(\bar{c}_{k,x}^t, \bar{c}_{k,y}^t)$$

is the position of the center point of the k-th target detection bounding box of the t-th frame target image on the feature map.

The advantages of the present invention are as follows:

The present invention provides a joint detection and re-identification multi-target tracking method based on feature decoupling. The present invention adopts a joint detection and re-identification multi-target tracking framework, combines the neural network in the detection stage and the re-identification network that extracts the target appearance features in the tracking stage, which can reduce the inference time of the model and increase the reusability of the model. The present invention decouples the features extracted by the backbone network from the two dimensions of channel and space, avoiding the problem of conflicting optimization directions between the detection task and the re-identification task during the training process, thereby improving the accuracy of multi-target tracking. The experimental results of the embodiments of the present invention show that the present invention can effectively improve the performance of multi-target tracking.

Additional advantages and features of the invention will become apparent from the description which follows, and may be realized by means of the instrumentalities and combinations particularly pointed out in the appended claims.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
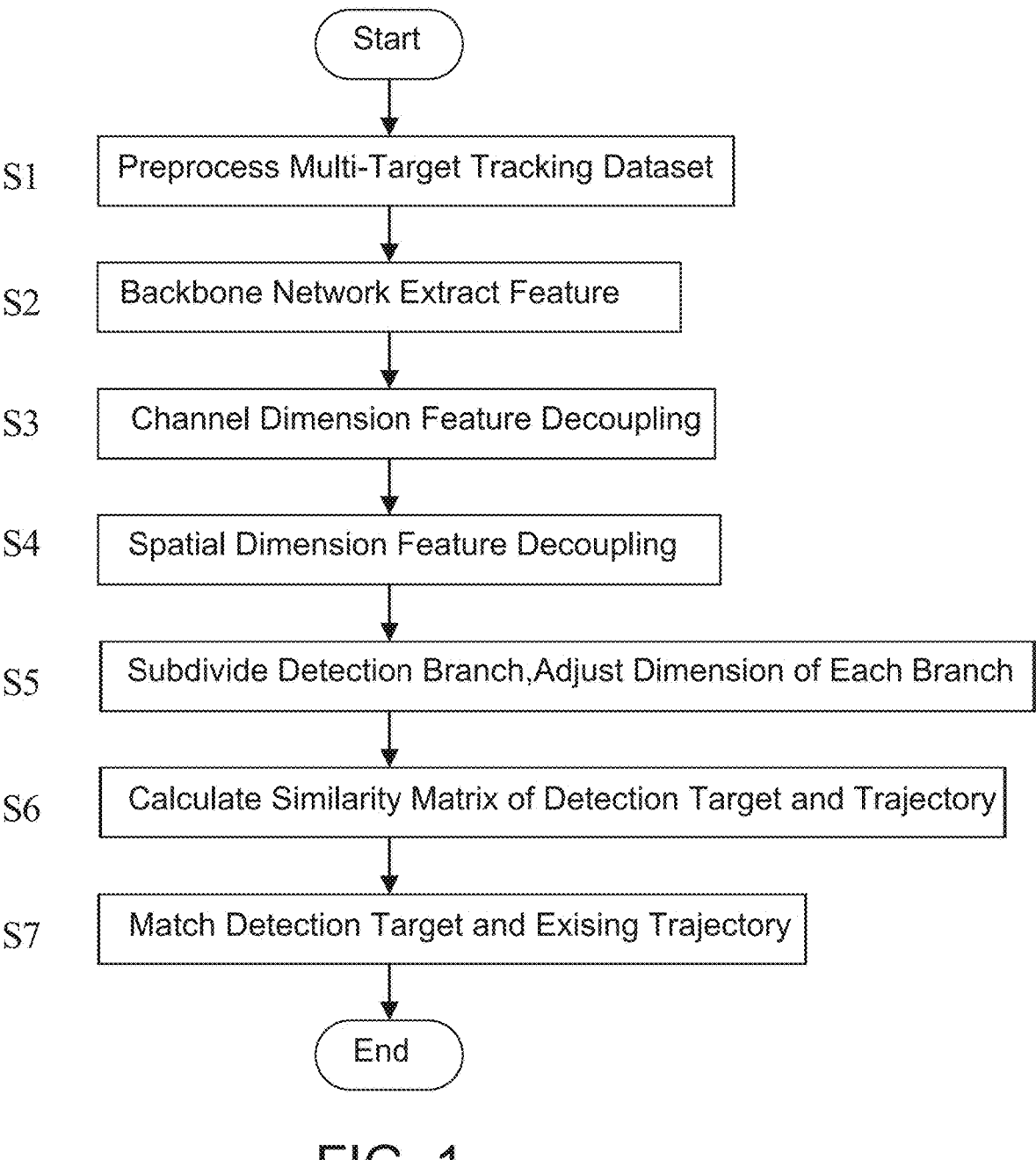
FIG. 1 is a flowchart according to the preferred embodiment of the present invention.
Figure 2:
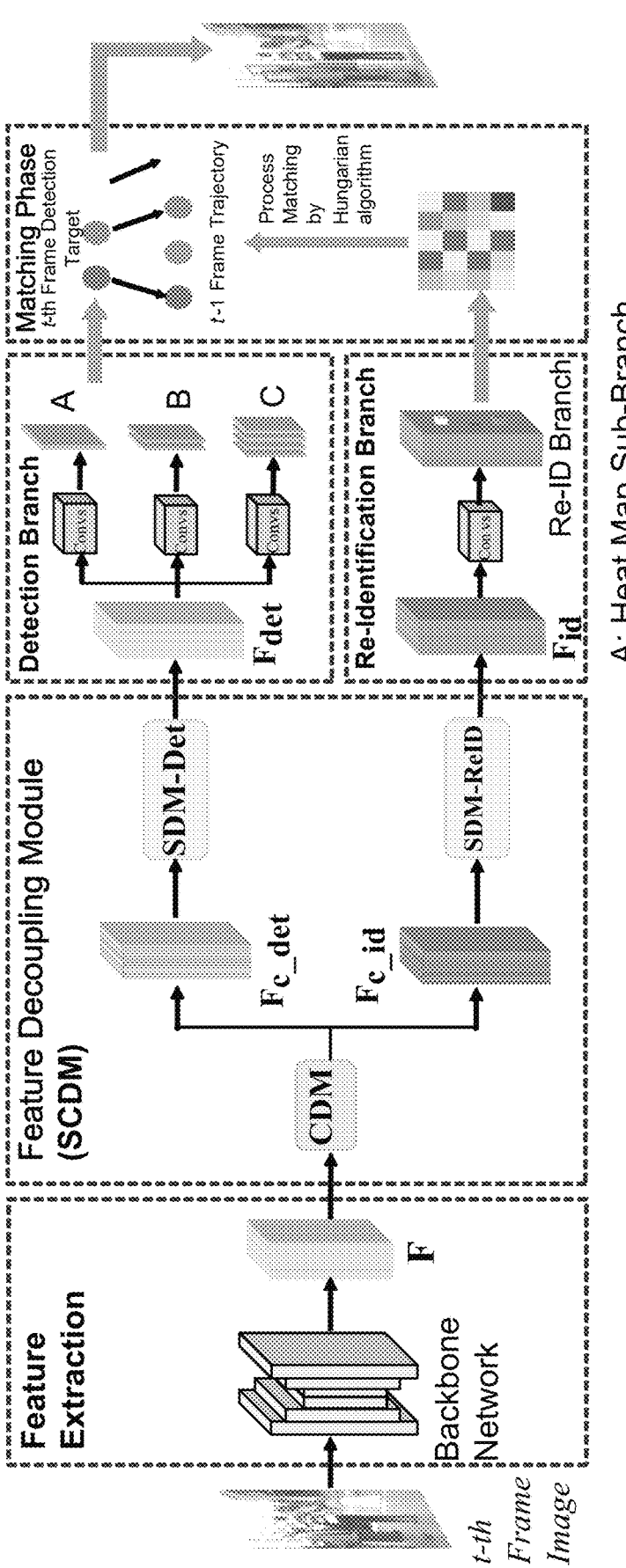
FIG. 2 illustrates an overall architecture according to the above preferred embodiment of the present invention.

Embodiment 1: As shown in FIG. 1 and FIG. 2 of the drawings, this embodiment provides a reasoning process of a joint detection and re-identification multi-target tracking method based on feature decoupling, in which the feature channel decoupling and spatial decoupling of the feature F extracted by the backbone network are the key points of the present invention, which will be specifically introduced in Embodiments 3, 4, 5 and 6. The specific process of this embodiment is:

Step 1: Obtain an i-th frame image of a video sequence to be tracked, and crop the i-th frame image to a size of 1088×608 to obtain an i-th frame target image to be detected.

Step 2: Input the i-th frame target image to be detected into a multi-target tracking model, and process model reasoning to obtain a center point coordinates $$\left(\hat{x}^i_{k'}, \hat{y}^i_{k'}\right)$$

of a k'-th target detection bounding box in the i-th frame target image be detected, a width and height $$\left(\hat{w}^i_{k'}, \hat{h}^i_{k'}\right)$$

of the target detection bounding box, an offset $$\left(\delta\hat{x}^i_{k'}, \delta\hat{y}^i_{k'}\right)$$

of the center point coordinates of the target detection bounding box, and a target identity vector $L^i(k')$ respectively, wherein $k' \in [1, K']$, K' is a total number of targets in the i-th frame target image;

wherein $$\delta x^i_{k'}$$

is an offset of the center point of the k'-th target detection bounding box in the i-th frame target image to be detected on an x-axis, and $$\delta\hat{y}^i_{k'}$$

is an offset of the center point of the k'-th target detection bounding box in the i-th frame target image to be detected on an y-axis.

Step 3: By using $$\left(\hat{x}^i_{k'}, \hat{y}^i_{k'}\right), \left(\hat{w}^i_{k'}, \hat{h}^i_{k'}\right), \text{ and } \left(\delta\hat{x}^i_{k'}, \delta\hat{y}^i_{k'}\right)$$

obtained from step 2, obtain a position the k'-th target detection bounding box in the i-th frame target image to be detected:

$$\left(\hat{x}^i_{k'} + 4\delta\hat{x}^i_{k'} - \hat{w}^i_{k'}/2, \hat{y}^i_{k'} + 4\delta\hat{y}^i_{k'} - \hat{h}^i_{k'}/2,\right.$$
$$\left.\hat{x}^i_{k'} + 4\delta\hat{x}^i_{k'} + \hat{w}^i_{k'}/2, \hat{y}^i_{k'} + 4\delta\hat{y}^i_{k'} - \hat{h}^i_{k'}/2\right);$$

wherein $$\left(\hat{x}^i_{k'} + 4\delta\hat{x}^i_{k'} - \hat{w}^i_{k'}/2, \hat{y}^i_{k'} + 4\delta\hat{y}^i_{k'} - \hat{h}^i_{k'}/2\right)$$

refers to coordinates at a top left corner of the k'-th target detection bounding box in the i-th frame target image to be detected, $$\left(\hat{x}^i_{k'} + 4\delta\hat{x}^i_{k'} + \hat{w}^i_{k'}/2, \hat{y}^i_{k'} + 4\delta\hat{y}^i_{k'} - \hat{h}^i_{k'}/2\right)$$

refers to coordinates at a bottom right corner of the k'-th target detection bounding box in the i-th frame target image to be detected.

Step 4: Determine whether i is equal to 1, if i=1, initialize all targets in the i-th frame target image to be detected as new trajectories, and use the target identity vector of the target as a feature of a corresponding trajectory, then let i=i+1, and return to step 1; if i≠1, continue to process step 5.

Step 5: Use the Kalman filter algorithm and the target detection bounding box position in the i-th frame target image to obtain the target prediction bounding box position in the i-th frame target image to be detected; use the target prediction bounding box position in the i-th frame target image to be detected, the target detection bounding box position in the i-th frame target image to be detected, the target identity vector of each target in the i-th frame target image to be detected, and the target identity vectors representing different existing trajectories in the i−1 th frame to obtain the similarity matrix D between the target in the i-th frame target image to be detected and the trajectory already existed in the i-th frame target image, specifically:

$$D = \lambda D_r + (1 - \lambda)D_m,$$

wherein $D_r$ is a matrix composed of a cosine distances between the identity vectors of different targets in the i-th frame target image to be detected and the target identity vector representing different trajectories in the i−1 th frame target image, $\lambda$ is the weight parameter, which is set at 0.98, and $D_m$ is a matrix composed of Mahalanobis distances between the prediction bounding box positions of different targets in the i-th frame target image to be detected and the detection bounding box positions of different targets in the i-th frame target image. In this step, the cosine distance similarity between the target identity vector of the first target in the i-th frame target image to be detected and all target identity vectors representing different trajectories in the i−1 th frame target image is the first row of $D_r$, and by analogy and in sequence, the matrix $D_r$ is obtained. Similarly, the matrix $D_m$ is obtained.

Step 6: Perform a first matching between the target detection bounding box in the i-th frame target image to be detected and the trajectories already existed in the i−1 th frame target image by taking D as a matching cost matrix and using the Hungarian algorithm and the matching cost matrix. Then perform a second matching by using IOU overlap threshold (0.5) on the target detection bounding box of the i-th frame target image to be detected that is unmatched in the first matching and the target prediction bounding box corresponding to each unmatched trajectory in the i−1 th frame (IOU matching). Lastly, label the unmatched trajectories as unmatched. If the trajectory already existed fails to match for 30 consecutive frames, then the target corresponding to the trajectory is determined as disappeared, and that particular trajectory already existed is deleted.

The second matching is IOU matching, and the IOU overlap threshold is set at 0.5.

The IOU matching comprises the steps of: obtaining an IOU value C of the target detection bounding box of the i-th frame target image to be detected that is unmatched in the first matching and the target prediction bounding box corresponding to each unmatched trajectory in the i−1 th frame, wherein if C is greater than the IOU overlap threshold, then matching is determined as successful; if C is smaller than the IOU overlap threshold, then matching is determined as unsuccessful.

Step 7: Determine whether i is equal to I. If i=I, output the successfully matched trajectory in step 6. If i<I, let i=i+1 and return to step 1, wherein I is the total number of frames in the video sequence to be tracked.

Embodiment 2: The multi-target tracking model is obtained by the followings:

S1: Preprocess a MOT17 dataset:

S101: Preprocess images in the MOT17 dataset:

Crop each frame of target image in the MOT17 dataset to a uniform size of 1088×608, and then carry out data enhancement processing of the target image by random rotation, scaling, and flipping to obtain a preprocessed target image.

The MOT17 dataset is an existing dataset which comprises a training set and a test set.

The MOT17 dataset comprises: every frame of the target image and an image label of the target image in the tracking target video.

The image label in the MOT17 dataset comprises an identity ID of each target in every frame of the target image and top left corner coordinates and bottom right corner coordinates of each target detection bounding box.

S102: Preprocess the image labels in the MOT17 dataset to obtain preprocessed image labels.

First, obtain coordinates of the center point of the target detection bounding box $$\left(c_{k,x}^t, c_{k,y}^t\right) = \left(\frac{x_{k,1}^t + x_{k,2}^t}{2}, \frac{y_{k,1}^t + y_{k,2}^t}{2}\right)$$

by using the coordinates of the top left corner and bottom right corner of each target detection bounding box;

wherein $$\left(x_{k,1}^t, y_{k,1}^t\right)$$

refers to the top left corner coordinates of the k-th target detection bounding box in the t-th frame target image, $$\left(x_{k,2}^t, y_{k,2}^t\right)$$

refers to the bottom right coordinates of the k-th target detection bounding box in the t-th frame target image.

Then, obtain width and height of the target detection bounding box:

$$s_k^t = \left(x_{k,2}^t - x_{k,1}^t, y_{k,2}^t - y_{k,1}^t\right);$$

and the position of the center point of the target detection bounding box on the feature map:

$$\left(\overline{c}_{k,x}^t, \overline{c}_{k,y}^t\right) = \left(\left\lfloor \frac{c_{k,x}^t}{4}\right\rfloor, \left\lfloor \frac{c_{k,y}^t}{4}\right\rfloor\right);$$

wherein $$x_{k,2}^t - x_{k,1}^t$$

refers to the width of the k-th target detection bounding box in the t-th frame target image, $$y_{k,2}^t - y_{k,1}^t$$

refers to the height of the k-th target detection bounding box in the t-th frame target image.

Then obtain the target identity vector $L^t(k)$ by processing one-hot vector encoding of the identity ID of the k-th target in the target image of the t-th frame.

Then obtain an offset of the center point of the k-th target detection bounding box in the t-th frame target image on the feature map, wherein the offset refers to:

$$o_k^t = \left( \frac{c_{k,x}^t}{4} - \left\lfloor \frac{c_{k,x}^t}{4} \right\rfloor, \frac{c_{k,y}^t}{4} - \left\lfloor \frac{c_{k,y}^t}{4} \right\rfloor \right);$$

wherein $$o_k^t$$

is the offset of the center point of the k-th target detection bounding box in the t-th frame target image.

Finally, use the coordinates of the center point of the target detection bounding box, the width and height of the target detection bounding box, the target identity vector, and the offset of the center point of the target detection bounding box on the feature map as the preprocessed image labels.

S103: Form a preprocessed MOT17 dataset by using the preprocessed image labels and the preprocessed images:

The preprocessed MOT17 dataset comprises a preprocessed training set and a preprocessed test set.

S2: Process training and testing the multi-target tracking network by using the preprocessed MOT17 dataset to obtain the multi-target tracking model.

The multi-target tracking network comprises: a backbone network module, a feature decoupling module, a target detection branch module, and a re-identification branch module.

The backbone network module is a DLA-34 network, which is used to obtain a feature F of the t-th frame target image.

The dimensions of F is 272×152×64.

The feature decoupling module comprises a channel decoupling unit and a spatial decoupling unit.

Figure 3:
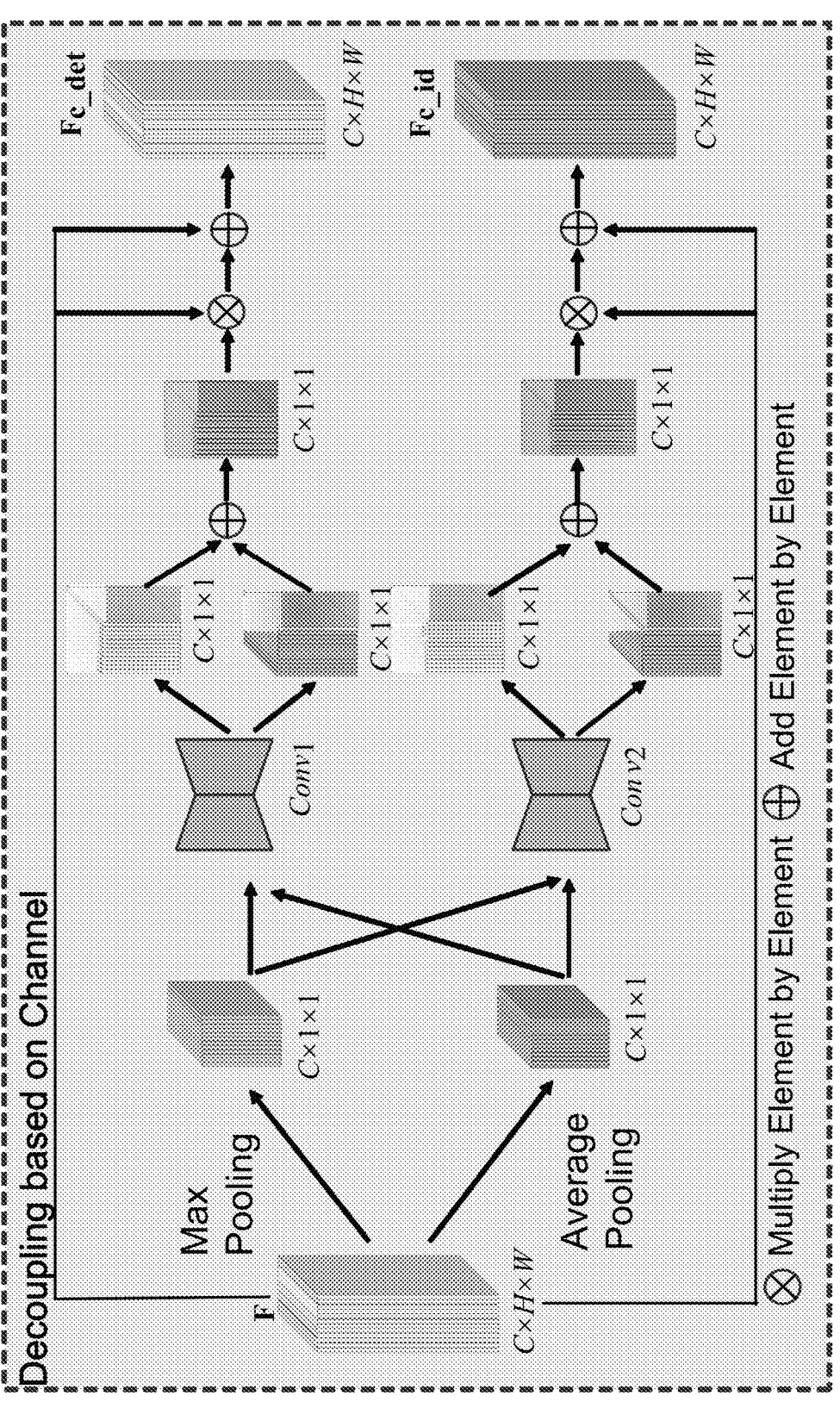
FIG. 3 illustrates the framework of a channel decoupling unit according to the above preferred embodiment of the present invention.

The channel decoupling unit is arranged to decouple the feature F in a channel dimension, and obtain a feature $F_{c\_det}$ for the detection branch after channel decoupling and the feature $F_{c\_id}$ for the re-identification branch after channel decoupling, which is shown in FIG. 3 of the drawings.

Figure 4:
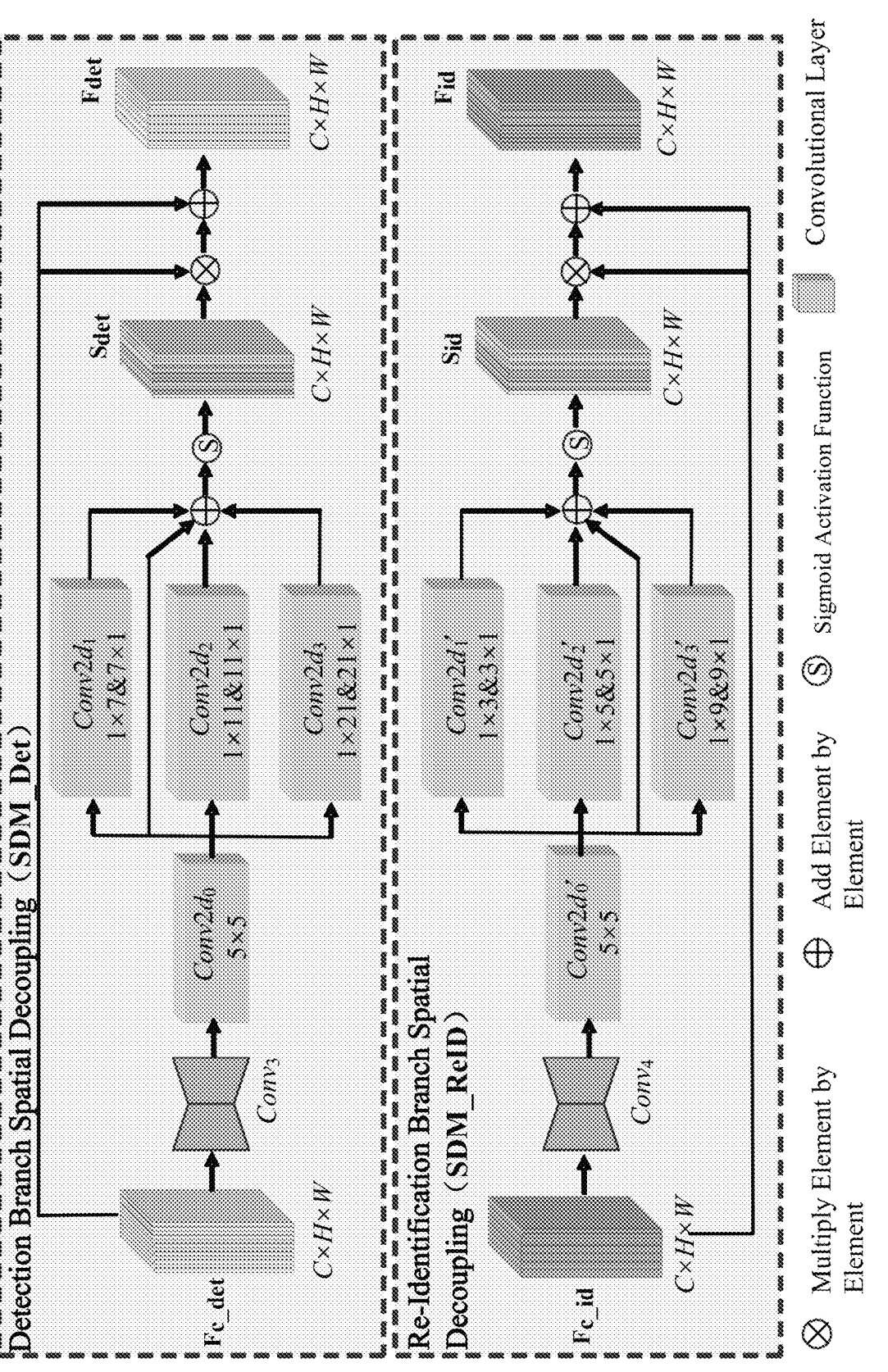
FIG. 4 illustrates the framework of a spatial decoupling unit according to the above preferred embodiment of the present invention.

The spatial decoupling unit is used to decouple $F_{c\_det}$ and $F_{c\_id}$ generated by the channel decoupling unit in the spatial dimension respectively to obtain spatially decoupled feature for detecting branch $F_{det}$ and spatially decoupled feature for re-identification branch $F_{id}$, which is shown in FIG. 4 of the drawings.

The target detection branch module comprises: a heat map sub-branch unit, a bounding box size sub-branch unit, and a center point offset sub-branch unit.

The target detection branch module uses the feature $F_{det}$ after spatial decoupling for the detection branch to obtain the coordinates of the center point of the target detection bounding box, the width and height of the target detection bounding box, and the offset of the center point of the target detection bounding box.

The re-identification branch module uses the feature $F_{id}$ to obtain the identity vector of each target in the target image.

Embodiment 3: Referring to FIG. 3 of the drawings, the channel decoupling unit comprises: a maximum pooling layer sub-unit, an average pooling layer sub-unit, a first convolution sub-unit $Conv_1$, a second convolution sub-unit $Conv_2$, a first element summation sub-unit, a second element summation sub-unit, a first residual link sub-unit, and a second residual link sub-unit.

Both of the inputs of the maximum pooling layer sub-unit and the average pooling layer sub-unit are the feature F. The output of the maximum pooling layer sub-unit is the input of the first convolution sub-unit $Conv_1$ and the second convolution sub-unit $Conv_2$. The output of the average pooling layer sub-unit is the input of the first convolution sub-unit $Conv_1$ and the second convolution sub-unit $Conv_2$. The output of the first convolution sub-unit $Conv_1$ is the input of the first element summation sub-unit. The output of the second convolution sub-unit $Conv_2$ is the input of the second element summation sub-unit. Through the Sigmoid activation function, the first element summation sub-unit output a detection branch channel attention weight $C_{det}$. Through the Sigmoid activation function, the first element summation sub-unit output a re-identification branch channel attention weight $C_{id}$. The input of the first residual link sub-unit is the detection branch channel attention weight $C_{det}$. and the feature F. The output of the first residual link sub-unit is a feature $F_{c\_det}$; for detection branch after channel decoupling. The input of the second residual link sub-unit is the re-identification branch channel attention weight $C_{id}$ and the feature F. The output of the second residual link sub-unit is a re-feature $F_{c\_id}$ for re-identification branch after channel decoupling.

The maximum pooling layer sub-unit is arranged to perform a maximum pooling operation on the feature F.

The average pooling layer sub-unit is arranged to perform an average pooling operation on the feature F.

The first convolution sub-unit $Conv_1$ comprises: a 1st convolution layer, a 2nd convolution layer, and a ReLU activation function.

The first convolution sub-unit $Conv_1$ is arranged to aggregate the channel information of the detection task of the feature F after maximum pooling and average pooling.

The second convolution sub-unit $Conv_2$ comprises: a 3rd convolution layer, a 4th convolution layer, and a ReLU activation function.

The second convolution sub-unit $Conv_2$ is arranged to aggregate the channel information of the feature F after maximum pooling and average pooling for the re-identification task.

The first element summation sub-unit is arranged to sum, element by element, the features output by the first convolutional layer sub-unit and to process through the Sigmoid activation function to obtain a detection branch channel attention weight $C_{det}$.

The second element summation sub-unit is arranged to sum, element by element, the features output by the second convolutional layer sub-unit and to process through the Sigmoid activation function to obtain a re-identification branch channel attention weight $C_{id}$.

The first residual link sub-unit is arranged to multiply $C_{det}$ by the feature F and add the feature F to obtain a detection branch feature $F_{c\_det}$.

The second residual link sub-unit is arranged to multiply $C_{id}$ by the feature F and add the feature F to obtain a re-identification branch feature $F_{c\_id}$.

Embodiment 4: The channel decoupling unit is used to decouple the feature F in the channel dimension to obtain the feature $F_{c\_det}$ after channel decoupling to be used for the detection branch and the feature $F_{c\_id}$ after channel decoupling to be used for the re-identification branch. Specifically, $$F_{c\_det} = F * C_{det} + F;$$

$$F_{c\_id} = F * C_{id} + F;$$

$$C_{det} = \sigma \left( Conv_1(AvgPool(F)) + Conv_1(MaxPool(F)) \right);$$

$$C_{id} = \sigma \left( Conv_2(AvgPool(F)) + Conv_2(MaxPool(F)) \right);$$

wherein F is the feature extracted by the backbone network, $C_{det}$ is the detection branch channel attention weight, $C_{id}$ is the re-identification branch channel attention weight, $F_{c\_det}$ is the channel decoupled feature to be used for the detection branch, $F_{c\_id}$ is the channel decoupled feature to be used for the re-identification branch, $\sigma$ is the Sigmoid activation function, $Conv_1$ is the first convolution sub-unit, $Conv_2$ is the second convolution sub-unit, AvgPool( ) is the average pooling operation, and MaxPool( ) is the maximum pooling operation.

According to this embodiment, the channel decoupling unit is designed to alleviate the problem of misalignment in the channel dimension when extracting features for detection tasks and re-identification tasks using the same backbone network. For feature F, the maximum pooling and average pooling is used first to aggregate channel information to enhance the representation ability of the model. Then, the aggregated channel information is sent to $Conv_1$ and $Conv_2$, and then element-by-element summation is used to obtain the channel attention weights $C_{det}$ and $C_{id}$ of the detection branch and the re-identification branch. Finally, $C_{det}$ and $C_{id}$ are used as weights to fuse with feature F through residual connection to obtain the feature $F_{c\_det}$ of the detection branch after channel decoupling and the feature $F_{c\_id}$ of the re-identification branch after channel decoupling. After the above operations, the feature F extracted by the backbone network is decoupled in the channel dimension.

Embodiment 5: Referring to FIG. 4 of the drawings, the spatial decoupling unit comprises a third convolution sub-unit $Conv_3$, a fourth convolution sub-unit $Conv_4$, a fifth convolution sub-unit, a sixth convolution sub-unit, a third element summation sub-unit, a fourth element summation sub-unit, a third residual link sub-unit, and a fourth residual link sub-unit.

The third convolution sub-unit $Conv_3$ comprises a 5th convolution layer of the 1×1 convolution kernel, a GELU activation function, and an input of the third convolution layer sub-unit as the feature $F_{c\_det}$.

The fourth convolution sub-unit $Conv_4$ comprises a 6th convolution layer of the 1×1 convolution kernel; a GELU activation function, and an input of the fourth convolution layer sub-unit as the feature $F_{c\_id}$.

The fifth convolution sub-unit comprises a first convolution block $Conv2d_0$, a second convolution block $Conv2d_1$, a third convolution block $Conv2d_2$, and a fourth convolution block $Conv2d_3$; and an input of the fifth convolution sub-unit is an output of the third convolution sub-unit.

The first convolution block $Conv2d_0$ is a 7th convolution layer of a 5×5 convolution kernel; an input of the first convolution block is an output of the third convolution sub-unit.

The second convolution block $Conv2d_1$ comprises a 8th convolution layer of a 1×7 convolution kernel and a 9th convolution layer of a 7×1 convolution kernel, wherein an output of the 8th convolution layer is an input of the 9th convolution layer.

The third convolution block $Conv2d_2$ comprises a 10th convolution layer of a 1×11 convolution kernel and an 11th convolution layer of a 11×1 convolution kernel, wherein an output of the 10th convolution layer is an input of the 11th convolution layer.

The fourth convolution block $Conv2d_3$ comprises a 12th convolution layer of a 1×21 convolution kernel and a 13th convolution layer of a 21×1 convolution kernel, wherein an output of the 12th convolution layer is an input of the 13th convolution layer.

The inputs of the second convolution block $Conv2d_1$, the third convolution block $Conv2d_2$, and the fourth convolution block $Conv2d_3$ are all output of the first convolution block $Conv2d_0$, The sixth convolution sub-unit comprises a fifth convolution block $Conv2d'_0$, a sixth convolution block $Conv2d'_1$, a seventh convolution block $Conv2d'_2$, and an eighth convolution block $Conv2d'_3$; an input of the sixth convolution sub-unit is an output of the fourth convolution sub-unit.

The fifth convolution block $Conv2d'_0$ is a 14th convolution layer of a 5×5 convolution kernel; an input of the fifth convolution block is an output of the fourth convolution sub-unit.

The sixth convolution block $Conv2d'_1$ comprises a 15th convolution layer of a 1×3 convolution kernel and a 16th convolution layer of a 3×1 convolution kernel, wherein an output of the 15th convolution layer is an input of the 16th convolution layer.

The seventh convolution block $Conv2d'_2$ comprises a 17th convolution layer of a 1×5 convolution kernel and an 18th convolution layer of a 5×1 convolution kernel, wherein an output of the 17th convolution layer is an input of the 18th convolution layer.

The eighth convolution block $Conv2d'_3$ comprises a 19th convolution layer of a 1×9 convolution kernel and a 20th convolution layer of a 9×1 convolution kernel, wherein an output of the 19th convolution layer is an input of the 20th convolution layer.

The inputs of the sixth convolution block $Conv2d'_1$, and the seventh convolution block $Conv2d'_2$ and the eighth convolution block $Conv2d'_3$ are all output of the fifth convolution block $Conv2d'_0$, The third element summation sub-unit is arranged to sum, element by element, the features output by the first convolution block $Conv2d_0$, the second convolution block $Conv2d_1$, the third convolution block $Conv2d_2$, and the fourth convolution block $Conv2d_3$ and the summation result is activated by the Sigmoid function to obtain a spatial attention weight $S_{det}$ of the spatial decoupling detection branch. The spatial attention weight $S_{det}$ is used as an input of the third residual link sub-unit.

The fourth element summation sub-unit is arranged to sum, element by element, the features output by the fifth convolution block $Conv2d'_0$, the sixth convolution block $Conv2d'_1$, the seventh convolution block $Conv2d'_2$ and the eighth convolution block $Conv2d'_3$ and the summation result is activated by the Sigmoid function to obtain a spatial attention weight $S_{id}$ of the spatial decoupling re-identification branch. The spatial attention weight $S_{id}$ is used as an input of the fourth residual link sub-unit.

The third residual link sub-unit is arranged to multiply $S_{det}$ by the feature $F_{c\_det}$ and add the feature $F_{c\_det}$ to obtain a feature $F_{det}$ for the detection branch after spatial decoupling.

The fourth residual link sub-unit is arranged to multiply $S_{id}$ by the feature $F_{c\_id}$ and add the feature $F_{c\_id}$ to obtain a feature $F_{id}$ for the re-identification branch after spatial decoupling.

Embodiment 6: The spatial decoupling unit is used to decouple the features $F_{c\_det}$ and $F_{c\_id}$ generated by the channel decoupling unit in the spatial dimension respectively to obtain the feature $F_{det}$ for the detection branch after decoupling by the spatial decoupling unit and the feature $F_{id}$ for the re-identification branch after decoupling by the spatial decoupling unit, specifically:

$$F_{det} = F_{c\_det} * S_{det} + F_{c\_det};$$

$$F_{id} = F_{c\_id} * S_{id} + F_{c\_id};$$

$$S_{det} = \sigma\left(Conv2d_0(Conv_3(F_{c\_det})) + \sum_{l=1}^{3}Conv2d_l(Conv2d_0(Conv_3(F_{c\_det})))\right);$$

$$S_{id} = \sigma\left(Conv2d'_0(Conv_4(F_{c\_id})) + \sum_{l'=1}^{3}Conv2d'_{l'}(Conv2d'_0(Conv_4(F_{c\_id})))\right);$$

wherein $F_{c\_det}$ is the feature of the detection branch after channel decoupling, $F_{c\_id}$ is the feature of the re-identification branch after channel decoupling, $S_{det}$ is the spatial attention weight of the spatial decoupling detection branch, $S_{id}$ is the spatial attention weight of the spatial decoupling re-identification branch, $F_{det}$ is the feature of the detection branch after spatial decoupling, $F_{id}$ is the feature of the re-identification branch after spatial decoupling, $Conv2d_0(\ )$ is the first convolution block, l and l' are integers from 1 to 3, $Conv2d_l(\ )$ is the second convolution block, the third convolution block or the fourth convolution block; $Conv2d'_0(\ )$ is the fifth convolution block, $Conv2d'_{l'}(\ )$ is the sixth convolution block, the seventh convolution block or the eighth convolution block.

According to this embodiment, the features $F_{c\_det}$ and $F_{c\_id}$ after channel decoupling, through the regional features in the feature map, are aggregated to generate regional weight matrices suitable for the detection branch and the re-identification branch respectively. First, $Conv_3$ and $Conv_4$ are used to adjust $F_{c\_det}$ and $F_{c\_id}$ respectively. Then, a multi-scale asymmetric convolution kernel is used to enhance the module's ability to extract features of targets of different scales. Next, the features extracted by convolution kernels of different scales are summed element by element, and the spatial attention weight $S_{det}$ of the detection branch and the spatial attention weight $S_{id}$ of the re-identification branch are obtained using the Sigmoid activation function. Finally, $S_{det}$ and $S_{id}$ are used as the spatial attention weights of the detection branch and the re-identification branch, and are fused with the features $F_{c\_det}$ and $F_{c\_id}$ through residual connections. After the above operations, the information of the two branches is decoupled in space dimension.

Embodiment 7: The target detection branch module comprises: a heat map sub-branch sub-unit, a center point offset sub-branch unit, and a bounding box size sub-branch unit.

The heat map sub-branch sub-unit comprises a seventh convolution sub-unit $Conv_5$.

The $Conv_5$ is used to adjust a dimension of the feature $F_{det}$ for the detection branch after decoupling and generate the center point coordinates of the target detection bounding box.

The $Conv_5$ comprises: a 21st convolution layer of a 3×3 convolution kernel, a first ReLU activation function layer, and a 22nd convolution layer of a 1×1 convolution kernel.

The Loss function of heat map sub-branch sub-unit $L_{heat}$ is:

$$L_{heat} = -\frac{1}{N}\sum_{x'y'}\begin{cases}(1 - \hat{M}_{x'y'})^\alpha \log(\hat{M}_{x'y'}) & M_{x'y'} = 1 \\ (1 - M_{x'y'})^\beta (\hat{M}_{x'y'})^\alpha \log(1 - \hat{M}_{x'y'}) & M_{x'y'} \neq 1\end{cases};$$

$$M_{x'y'} = \sum_{k=1}^{K}\exp\left\{-\frac{(x' - \bar{c}^t_{k,x})^2 + (y' - \bar{c}^t_{k,y})^2}{2\sigma_c^2}\right\};$$

Wherein $L_{heat}$ is the loss function of the heat map sub-branch sub-unit, K is the total number of targets in the t-th frame target image, k is the target label in the t-th frame target image, $M_{x'y'}$ is the heat map value corresponding to the midpoint (x', y') in the heat map of $F_{det}$, $\hat{M}_{x'y'}$ is the heat map value corresponding to the midpoint (x', y') in the heat map of $F_{det}$ predicted by the heat map sub-branch unit, and $\alpha$ and $\beta$ are preset hyperparameters. According to this embodiment, $\alpha=2$, $\beta=4$, $\sigma_c$ is the target scale adaption standard deviation, $$(\bar{c}^t_{k,x}, \bar{c}^t_{k,y})$$

is the position of the center point of the detection bounding box of the k-th target in the t-th frame target image on the feature map.

The center point offset sub-branch unit comprises an eighth convolution sub-unit $Conv_6$.

The eighth convolution sub-unit $Conv_6$ is used to adjust the dimension of the feature $F_{det}$ for the detection branch after decoupling to generate the offset of the center point of the target detection bounding box.

The eighth convolution sub-unit $Conv_6$ comprises: a 23rd convolution layer of the 3×3 convolution kernel, a ReLU activation function layer, and a 24th convolution layer of the 1×1 convolution kernel.

The bounding box size sub-branch unit comprises a ninth convolution sub-unit $Conv_7$.

The ninth convolution sub-unit $Conv_7$ is used to adjust the dimension of the feature $F_{det}$ for the detection branch after decoupling to generate the width and height of the target detection bounding box.

The ninth convolution sub-unit $Conv_7$ comprises: a 25th convolution layer of the 3×3 convolution kernel, a ReLU activation function layer, and a 26th convolution layer of the 1×1 convolution kernel.

The Loss function $L_{box}$ of the center point offset sub-branch unit and the bounding box size sub-branch unit are as follows:

$$L_{box} = \sum_{k=1}^{K}(|o^t_k - \hat{o}^t_k| + \lambda_s|s^t_k - \hat{s}^t_k|);$$

wherein K is the total number of targets in the t-th frame target image, $$o^t_k$$

is the true offset of the center point of the k-th target detection bounding box of the t-th frame target image, $$\hat{o}^t_k$$

is the predicted offset of the center point of the k-th target detection bounding box of the t-th frame target image, $$s^t_k$$

is the true size of the K-th target detection bounding box of the t-th frame target image, $$\hat{s}_k^t$$

is the predicted size of the k-th target detection bounding box of the t-th frame target image, $\lambda_s$ is a preset constant, which is set as 0.1.

The re-identification branch module comprises a tenth convolution sub-unit $Conv_8$.

The re-identification branch module is used to extract the identity ID of each target one-hot vector encoding.

The $Conv_8$ is used to adjust the dimension of the decoupled re-identification branch $F_{id}$ to generate the target identity vector.

The tenth convolution subunit $Conv_8$ comprises: a 27th convolution layer of the 3×3 convolution kernel, a ReLU activation function layer, and a 28th convolution layer of the 1×1 convolution kernel.

The Loss function $L_{id}$ of the re-identification branch module is obtained by the followings:

$$L_{id} = -\sum_{k=1}^{K} \sum_{m=1}^{M} L^k(m) \log(p(m));$$

wherein K is the total number of targets in the t-th frame target image, M is the total number of target identity in the training set, m is the label of the target identity category in the training set, p(m) is the target identity category distribution vector predicted by the re-identification branch module, $L^k(m)$ is the identity vector label after one-hot encoding of the k-th target in the t-th frame target image.

The total loss function $L_{total}$ of the detection branch module and the re-identification branch module is specifically:

$$L_{total} = \frac{1}{2}(e^{-w_1}(L_{heat} + L_{box}) + e^{-w_1}L_{id} + w_1 + w_2);$$

wherein w1 and w2 are two learnable parameters.

Exemplary Embodiment: In order to verify the beneficial effects of the present invention, the following experiments are carried out:

This exemplary embodiment conducts a series of ablation experiments on the MOT17 dataset, including experiments based on channel decoupling and spatial decoupling:

The evaluation indicators used in this exemplary embodiment include multiple objection tracking accuracy (MOTA) and target identity precision recall F1 score IDF1. The former focuses on measuring the performance of the multi-target tracking detection phase; the latter focuses on measuring the performance of the multi-target tracking matching phase. Their calculation formulas are as follows:

$$MOTA = 1 - \frac{FN + FP + IDSW}{GT};$$

$$IDF1 = \frac{2IDTP}{2IDTP + IDFP + IDFN}.$$

Wherein FN is the number of real targets that are not correctly detected, i.e., missed detections; FP is the number of wrong detections, i.e., false alarms; IDSW is the number of target identity switching during tracking; GT is the number of real frames. IDTP, IDFP, and IDFN are the correct matches, false alarms, and missed detections of target IDs, respectively.

Since the MOT challenge official website has not published the identity labels of the MOT17 test dataset, the MOT17 training set is evenly divided into two parts, the first part is used for training, and the second part is used for testing. This design is intended to ensure that the experimental results are fair and verifiable. The final results are shown in Table 1.

TABLE 1

Comparison of channel and spatial decoupling ablation experiments

| Method | MOTA↑ | IDF1↑ | FP↓ | FN↓ | IDSW↓ |
|---|---|---|---|---|---|
| Baseline (FairMOT) | 67.4 | 71.3 | 3753 | 13437 | 438 |
| Baseline + channel decoupling | 67.7 | 72.0 | 3510 | 13534 | 393 |
| Baseline + spatial decoupling | 67.8 | 71.7 | 3290 | 13724 | 413 |
| Baseline + channel decoupling + spatial decoupling | 68.0 | 72.8 | 3365 | 13563 | 370 |

According to the first and second rows of Table 1, the results show that the baseline algorithm FairMOT has higher FP and IDSW. According to the first and second rows of Table 1, after adding the channel decoupling unit to the baseline algorithm, MOTA is increased by 0.3 (67.4-67.7), IDF1 is increased by 0.7 (71.3-72.0), and IDSW is decreased by about 10.3% (438-393). According to the first and third rows of Table 1, after adding the spatial decoupling unit to the baseline algorithm, MOTA is increased by 0.4 (67.4-67.8) and IDF1 is increased by 0.4 (71.3-71.7). According to the first and fourth rows of Table 1, after adding channel and spatial decoupling units to the baseline algorithm, MOTA is increased by 0.6 (67.4-68.0), IDF1 is increased by 1.5 (71.3-72.8), and IDSW is decreased by about 15.5% (438-370). Therefore, it is concluded that adding decoupling units in channel and spatial dimensions to the baseline algorithm can alleviate the problem of feature misalignment in the channel and spatial dimensions of detection and re-identification tasks respectively, and effectively improve the performance of the joint detection and re-identification multi-target tracking algorithm.

In addition, training is performed on multiple datasets including CrowdHuman, Caltech, CUHK-SYSU, PRW, and MOT17. Then, the weights of the training results are used to predict the tracking results of MOT17. Finally, the prediction results are submitted to the MOT challenge website and compared with the results of the commonly used multi-target tracking algorithm on MOT17. The final results are shown in Table 2.

TABLE 2

Comparison of evaluation results of different methods on MOT17

| Method | MOTA↑ | IDF1↑ | FP↓ | FN↓ | IDSW↓ |
|---|---|---|---|---|---|
| Tracktor++v2 | 56.3 | 55.1 | 8866 | 235449 | 1987 |
| JDE | 63.0 | 59.5 | 39888 | 162927 | 6171 |
| CenterTrack | 67.8 | 64.7 | 18498 | 160332 | 3039 |
| MAT | 69.5 | 63.1 | 30660 | 138741 | 2844 |
| QuasiDense | 68.7 | 66.3 | 26589 | 146643 | 3378 |

TABLE 2-continued

| Comparison of evaluation results of different methods on MOT17 | | | | |
|---|---|---|---|---|
| Method | MOTA↑ | IDF1↑ | FP↓ | FN↓ | IDSW↓ |
| FairMOT | 73.7 | 72.3 | 27507 | 117477 | 3303 |
| Ours | 73.8 | 73.2 | 27171 | 117627 | 2901 |

The above ablation experiments and the comparison results with various methods show that the decoupling method of the present invention can effectively alleviate the competition between the detection and re-identification tasks in the joint detection and re-identification algorithm during the training process, and improve the performance of multi-target tracking. Compared with other multi-target tracking algorithms, both the multi-target tracking accuracy and IDF1 of the present invention have certain advantages.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A multi-target tracking method with joint detection and re-identification based on feature decoupling, executed and processed by a computer, comprising the steps of:

Step 1: obtaining an i-th frame image of a video sequence to be tracked, and cropping the i-th frame image to a predetermined size to obtain an i-th frame target image to be detected;

Step 2: inputting the i-th frame target Image to be detected into a multi-target tracking model, and obtaining a center point coordinates $$\left(\hat{x}_{k'}^i, \hat{y}_{k'}^i\right)$$

of a k'-th target detection bounding box in the i-th frame target image be detected, a width and height $$\left(\hat{w}_{k'}^i, \hat{h}_{k'}^i\right)$$

of the target detection bounding box, an offset $$\left(\delta\hat{x}_{k'}^i, \delta\hat{y}_{k'}^i\right)$$

of the center point coordinates of the target detection bounding box, and a target identity vector $L^i(k')$;

wherein $k' \in [1, K']$, K' is a total number of targets in the i-th frame target image;

wherein $$\delta\hat{x}_{k'}^i$$

is an offset of the center point of the k'-th target detection bounding box in the i-th frame target image to be detected on an x-axis, and $$\delta\hat{y}_{k'}^i$$

is an offset of the center point of the k'-th target detection bounding box in the i-th frame target image to be detected on an y-axis;

Step 3: by using $$\left(\hat{x}_{k'}^i, \hat{y}_{k'}^i,\right), \left(\hat{w}_{k'}^i, \hat{h}_{k'}^i\right), \text{ and } \left(\delta\hat{x}_{k'}^i, \delta\hat{y}_{k'}^i\right)$$

obtained from step 2, obtaining a position of the k'-th target detection bounding box in the i-th frame target image to be detected:

$$\left(\hat{x}_{k'}^i + 4\delta\hat{x}_{k'}^i - \hat{w}_{k'}^i/2, \hat{y}_{k'}^i + 4\delta\hat{y}_{k'}^i - \hat{h}_{k'}^i/2, \right.$$
$$\left. \hat{x}_{k'}^i + 4\delta\hat{x}_{k'}^i + \hat{w}_{k'}^i/2, \hat{y}_{k'}^i + 4\delta\hat{y}_{k'}^i - \hat{h}_{k'}^i/2\right);$$

Step 4: judging whether i is equal to 1, if i=1, initializing all targets in the i-th frame target image to be detected as new trajectories, and using the target identity vector of the target as a feature of a corresponding trajectory, then letting i=i+1, and returning to step 1; if i≠1, continuing to process step 5;

Step 5: obtaining the target prediction bounding box position in the i-th frame target image to be detected by using a Kalman filter algorithm and the target detection bounding box position in the i-th frame target image; then obtaining a similarity matrix D between the target in the i-th frame target image to be detected and the trajectory already existed in the i-th frame target image by using the target prediction bounding box position in the i-th frame target image to be detected, the target detection bounding box position in the i-th frame target image to be detected, the target identity vector of each target in the i-th frame target image to be detected, and the target identity vectors representing different existing trajectories in the i−1 th frame;

Step 6: performing a first matching between the target detection bounding box in the i-th frame target image to be detected and the existing trajectories in the i−1 th frame target image by taking D as a matching cost matrix and using the Hungarian algorithm and the matching cost matrix; then performing a second matching by using IOU overlap threshold on the target detection bounding box of the i-th frame target image to be detected that is unmatched in the first matching and the target prediction bounding box corresponding to each unmatched trajectory in the i−1 th frame; lastly, labelling the unmatched trajectories as unmatched, defining that the target corresponding to the trajectory that has not been matched for Z consecutive frames as disappeared and deleting the existing trajectories of the disappeared target;

wherein z is a positive integer;

the step of performing a second matching by using IOU overlap threshold on the target detection bounding box of the i-th frame target image to be detected that is unmatched in the first matching and the target prediction bounding box corresponding to each unmatched trajectory in the i−1 th frame, specifically:

obtaining an IOU value C of the target detection bounding box of the i-th frame target image to be detected that is unmatched in the first matching and the target prediction bounding box corresponding to each unmatched trajectory in the i−1 th frame, matching is successful if C is greater than the IOU overlap threshold, and matching is not successful if C is smaller than the IOU overlap threshold;

Step 7: determining whether i is equal to 1, if i=1, output the trajectory successfully matched in step 6, if i<1, let i=i+1 and returning to step 1, wherein 1 is the total number of frames in the video sequence to be tracked.

2. The multi-target tracking method with joint detection and re-identification based on feature decoupling according to claim 1, in step 5, the similarity matrix D refers to:

$$D = \lambda D_r + (1 - \lambda)D_m$$

wherein $D_r$ is a matrix composed of a cosine distances between the identity vectors of different targets in the i-th frame target image to be detected and the target identity vector representing different trajectories in the i−1 th frame target image, $\lambda$ is the weight parameter, and $D_m$ is a matrix composed of Mahalanobis distances between the prediction bounding box positions of different targets in the i-th frame target image to be detected and the detection bounding box positions of different targets in the i-th frame target image.

3. The multi-target tracking method with joint detection and re-identification based on feature decoupling according to claim 2, wherein the multi-target tracking model in step 2 is obtained by the steps of:

S1: preprocessing a MOT17 dataset to obtain a preprocessed MOT17 dataset, specifically:

S101: preprocessing images in the MOT17 dataset:

cropping each frame of target image in the MOT17 dataset to a uniform size, and then carrying out data enhancement processing of the target image to obtain a preprocessed target image;

wherein the data enhancement processing comprises random rotation, scaling and flipping operations;

the MOT17 dataset comprises a training set and a test set;

the MOT17 dataset comprises: every frame of the target image and an image label of the target image in the tracking target video;

the image label in the MOT17 dataset comprises: an identity ID of each target in every frame of the target image and top left corner coordinates and bottom right corner coordinates of each target detection bounding box;

S102: preprocessing the image labels in the MOT17 dataset to obtain preprocessed image labels:

first, obtaining coordinates of the center point of the target detection bounding box $$\left(c_{k,x}^t, c_{k,y}^t\right) = \left(\frac{x_{k,1}^t + x_{k,2}^t}{2}, \frac{y_{k,1}^t + y_{k,2}^t}{2}\right)$$

by using the coordinates of the top left corner box and bottom right corner of each target detection bounding box;

wherein $$\left(x_{k,1}^t, y_{k,1}^t\right)$$

refers to the top left corner coordinates of the k-th target detection bounding box in the t-th frame target image, $$\left(x_{k,2}^t, y_{k,2}^t\right)$$

refers to the bottom right coordinates of the k-th target detection bounding box in the t-th frame target image; then, obtaining width and height $$\left(x_{k,2}^t - x_{k,1}^t, y_{k,2}^t - y_{k,1}^t\right)$$

of the target detection bounding box; wherein $$x_{k,2}^t + x_{k,1}^t$$

refers to the width of the k-th target detection bounding box in the t-th frame target image, $$y_{k,2}^t + y_{k,1}^t$$

refers to the height of the k-th target detection bounding box in the t-th frame target image;

then, obtaining the target identity vector $L^t(k)$ by processing one-hot vector encoding of the identity ID of the k-th target in the target image of the t-th frame;

then, obtaining an offset of the center point of the k-th target detection bounding box in the t-th frame target image on a feature map, wherein the offset refers to:

$$o_k^t = \left(\frac{c_{k,x}^t}{4} - \left\lfloor\frac{c_{k,x}^t}{4}\right\rfloor, \frac{c_{k,y}^t}{4} - \left\lfloor\frac{c_{k,y}^t}{4}\right\rfloor\right);$$

finally, using the coordinates of the center point of the target detection bounding box, the width and height of the target detection bounding box, the target identity vector, and the offset of the center point of the target detection bounding box on the feature map as the preprocessed image labels;

S103: forming a preprocessed MOT17 dataset by using the preprocessed image labels and the preprocessed images:

the preprocessed MOT17 dataset comprises: a preprocessed training set and a preprocessed test set;

S2: training and testing the multi-target tracking network by using the preprocessed MOT17 dataset to obtain the multi-target tracking model.

4. The multi-target tracking method with joint detection and re-identification based on feature decoupling according to claim 1, wherein the multi-target tracking network in S2 comprises: a backbone network module, a feature decoupling module, a target detection branch module, a re-identification branch module;

the backbone network module is a DLA-34 network, which is used to obtain a feature F of the t-th frame target image;

the feature decoupling module comprises a channel decoupling unit and a spatial decoupling unit;

the channel decoupling unit is arranged to decouple the feature F in a channel dimension, and obtain a feature $F_{c\_det}$ for the detection branch after channel decoupling and the feature $F_{c\_id}$ for the re-identification branch after channel decoupling;

the spatial decoupling unit is used to decouple $F_{c\_det}$ and $F_{c\_id}$ in the spatial dimension respectively to obtain spatially decoupled features for detection branches $F_{det}$ and spatially decoupled features for re-identification branches $F_{id}$;

the target detection branch module comprises: a heat map sub-branch unit, a bounding box size sub-branch unit, and a center point offset sub-branch unit;

the heat map sub-branch unit comprises a seventh convolution sub-unit $Conv_5$;

the $Conv_5$ is used to adjust a dimension of the feature $F_{det}$ and generate the center point coordinates of the target detection bounding box;

the $Conv_5$ comprises: a 21st convolution layer of a 3×3 convolution kernel, a first ReLU activation function layer, and a 22nd convolution layer of a 1×1 convolution kernel;

the center point offset sub-branch unit comprises an eighth convolution sub-unit $Conv_6$;

the eighth convolution sub-unit $Conv_6$ is used to adjust the dimension of the feature $F_{det}$ to generate the offset of the center point of the target detection bounding box;

the eighth convolution sub-unit $Conv_6$ comprises: a 23rd convolution layer of the 3×3 convolution kernel, a ReLU activation function layer, and a 24th convolution layer of the 1×1 convolution kernel;

the bounding box size sub-branch unit comprises a ninth convolution sub-unit $Conv_7$;

the ninth convolution sub-unit $Conv_7$ is used to adjust the dimension of the feature $F_{det}$ to generate the width and height of the target detection bounding box;

the ninth convolution sub-unit $Conv_7$ comprises: a 25th convolution layer of the 3×3 convolution kernel, a ReLU activation function layer, and a 26th convolution layer of the 1×1 convolution kernel;

the re-identification branch module uses the feature $F_{id}$ to obtain every target identity vector in the target image;

the re-identification branch module comprises a tenth convolution sub-unit $Conv_8$;

the $Conv_8$ is used to adjust the dimension of $F_{id}$ to generate the target identity vector;

the tenth convolution subunit $Conv_8$ comprises: a 27th convolution layer of the 3×3 convolution kernel, a ReLU activation function layer, and a 28th convolution layer of the 1×1 convolution kernel.

5. The multi-target tracking method with joint detection and re-identification based on feature decoupling according to claim 4, wherein the channel decoupling unit comprises: a maximum pooling layer sub-unit, an average pooling layer sub-unit, a first convolution sub-unit $Conv_1$, a second convolution sub-unit $Conv_2$, a first element summation sub-unit, a second element summation sub-unit, a first residual link sub-unit, and a second residual link sub-unit;

the maximum pooling layer sub-unit is arranged to perform a maximum pooling operation on the feature F;

the average pooling layer sub-unit is arranged to perform an average pooling operation on the feature F;

the first convolution sub-unit $Conv_1$ comprises: a 1st convolution layer, a 2nd convolution layer, and a ReLU activation function;

the first convolution sub-unit $Conv_1$ is arranged to aggregate the channel information of the detection task of the feature F after maximum pooling and average pooling;

the second convolution sub-unit $Conv_2$ comprises: a 3rd convolution layer, a 4th convolution layer, and a ReLU activation function;

the second convolution sub-unit $Conv_2$ is arranged to aggregate the channel information of the feature F after maximum pooling and average pooling for the re-identification task;

the first element summation sub-unit is arranged to sum, element by element, the features output by the first convolutional layer sub-unit and to process through the Sigmoid activation function to obtain a detection branch channel attention weight $C_{det}$;

the second element summation sub-unit is arranged to sum, element by element, the features output by the second convolutional layer sub-unit and to process through the Sigmoid activation function to obtain a re-identification branch channel attention weight $C_{id}$;

the first residual link sub-unit is arranged to multiply $C_{det}$ by the feature F and add the feature F to obtain a detection branch feature $F_{c\_det}$;

the second residual link sub-unit is arranged to multiply $C_{id}$ by the feature F and add the feature F to obtain a re-identification branch feature $F_{c\_id}$.

6. The multi-target tracking method with joint detection and re-identification based on feature decoupling according to claim 5, wherein the feature $F_{c\_det}$ for the detection branch after channel decoupling and the feature $F_{c\_id}$ for the re-identification branch after channel decoupling are:

$$F_{c\_det} = F * C_{det} + F;$$

$$F_{c\_id} = F * C_{id} + F;$$

$$C_{det} = \sigma\left(Conv_1(AvgPool(F)) + Conv_1(MaxPool(F))\right);$$

$$C_{id} = \sigma\left(Conv_2(AvgPool(F)) + Conv_2(MaxPool(F))\right);$$

wherein $C_{det}$ is the detection branch channel attention weight, $C_{id}$ is the re-identification branch channel attention weight, $F_{c\_det}$ is the channel decoupled feature to be used for the detection branch, $F_{c\_id}$ is the channel decoupled feature to be used for the re-identification branch, $\sigma$ is the Sigmoid activation function, $Conv_1$ is the first convolution sub-unit, $Conv_2$ is the second convolution sub-unit, AvgPool( ) is the average pooling operation, and MaxPool( ) is the maximum pooling operation.

7. The multi-target tracking method with joint detection and re-identification based on feature decoupling according to claim 6, wherein the spatial decoupling unit comprises a third convolution sub-unit $Conv_3$, a fourth convolution sub-unit $Conv_4$, a fifth convolution sub-unit, a sixth convolution sub-unit, a third element summation sub-unit, a fourth element summation sub-unit, a third residual link sub-unit, and a fourth residual link sub-unit;

the third convolution sub-unit $Conv_3$ comprises a 5th convolution layer of the 1×1 convolution kernel, a GELU activation function, and an input of the third convolution layer sub-unit as the feature $F_{c\_det}$;

the fourth convolution sub-unit $Conv_4$ comprises a 6th convolution layer of the 1×1 convolution kernel, a GELU activation function, and an input of the fourth convolution layer sub-unit as the feature $F_{c\_id}$;

the fifth convolution sub-unit comprises a first convolution block $Conv2d_0$, a second convolution block $Conv2d_1$, a third convolution block $Conv2d_2$, and a fourth convolution block $Conv2d_3$; an input of the fifth convolution sub-unit is an output of the third convolution sub-unit;

the first convolution block $Conv2d_0$ is a 7th convolution layer of a 5×5 convolution kernel; an input of the first convolution block is an output of the third convolution sub-unit;

the second convolution block $Conv2d_1$ comprises a 8th convolution layer of a 1×7 convolution kernel and a 9th convolution layer of a 7×1 convolution kernel, wherein an output of the 8th convolution layer is an input of the 9th convolution layer;

the third convolution block $Conv2d_2$ comprises a 10th convolution layer of a 1×11 convolution kernel and a 11th convolution layer of a 11×1 convolution kernel, wherein an output of the 10th convolution layer is an input of the 11th convolution layer;

the fourth convolution block $Conv2d_3$ comprises a 12th convolution layer of a 1×21 convolution kernel and a 13th convolution layer of a 21×1 convolution kernel, wherein an output of the 12th convolution layer is an input of the 13th convolution layer;

the inputs of the second convolution block $Conv2d_1$, the third convolution block $Conv2d_2$, and the fourth convolution block $Conv2d_3$ are all output of the first convolution block $Conv2d_0$;

the sixth convolution sub-unit comprises a fifth convolution block $Conv2d'_0$, a sixth convolution block $Conv2d'_1$, a seventh convolution block $Conv2d'_2$, and an eighth convolution block $Conv2d'_3$; an input of the sixth convolution sub-unit is an output of the fourth convolution sub-unit;

the fifth convolution block $Conv2d'_0$ is a 14th convolution layer of a 5×5 convolution kernel; an input of the fifth convolution block is an output of the fourth convolution sub-unit;

the sixth convolution block $Conv2d'_1$ comprises a 15th convolution layer of a 1×3 convolution kernel and a 16th convolution layer of a 3×1 convolution kernel, wherein an output of the 15th convolution layer is an input of the 16th convolution layer;

the seventh convolution block $Conv2d'_2$ comprises a 17th convolution layer of a 1×5 convolution kernel and a 18th convolution layer of a 5×1 convolution kernel, wherein an output of the 17th convolution layer is an input of the 18th convolution layer;

the eighth convolution block $Conv2d'_3$ comprises a 19th convolution layer of a 1×9 convolution kernel and a 20th convolution layer of a 9×1 convolution kernel, wherein an output of the 19th convolution layer is an input of the 20th convolution layer;

the inputs of the sixth convolution block $Conv2d'_1$, and the seventh convolution block $Conv2d'_2$ and the eighth convolution block $Conv2d'_3$ are all output of the fifth convolution block $Conv2d'_0$;

the third element summation sub-unit is arranged to sum, element by element, the features output by the first convolution block $Conv2d_0$, the second convolution block $Conv2d_1$, the third convolution block $Conv2d_2$, and the fourth convolution block $Conv2d_3$ and the summation result is activated by the Sigmoid function to obtain a spatial attention weight $S_{det}$ of the spatial decoupling detection branch;

the fourth element summation sub-unit is arranged to sum, element by element, the features output by the fifth convolution block $Conv2d'_0$, the sixth convolution block $Conv2d'_1$, the seventh convolution block $Conv2d'_2$ and the eighth convolution block $Conv2d'_3$ and the summation result is activated by the Sigmoid function to obtain a spatial attention weight $S_{id}$ of the spatial decoupling re-identification branch;

the third residual link sub-unit is arranged to multiply $S_{det}$ by the feature $F_{c\_det}$ and to add the feature $F_{c\_det}$ to obtain a feature $F_{det}$ for the detection branch after spatial decoupling; and the second residual link sub-unit is arranged to multiply $S_{id}$ by the feature $F_{c\_id}$ and to add the feature $F_{c\_id}$ to obtain a feature $F_{id}$ for the re-identification branch after spatial decoupling.

8. The multi-target tracking method with joint detection and re-identification based on feature decoupling according to claim 7, wherein the feature $F_{det}$ for the detection branch after spatial decoupling and the feature $F_{id}$ for the re-identification branch after spatial decoupling are obtained based on:

$$F_{det} = F_{c\_det} * S_{det} + F_{c\_det};$$

$$F_{id} = F_{c\_id} * S_{id} + F_{c\_id};$$

$$S_{det} = \sigma\left(Conv2d_0(Conv_3(F_{c\_det})) + \sum_{l=1}^{3} Conv2d_l(Conv2d_0(Conv_3(F_{c\_det})))\right);$$

$$S_{id} = \sigma\left(Conv2d'_0(Conv_4(F_{c\_id})) + \sum_{l'=1}^{3} Conv2d'_{l'}(Conv2d'_0(Conv_4(F_{c\_id})))\right);$$

wherein $F_{c\_det}$ is the feature of the detection branch after channel decoupling, $F_{c\_id}$ is the feature of the re-identification branch after channel decoupling, $S_{det}$ is the spatial attention weight of the spatial decoupling detection branch, $S_{id}$ is the spatial attention weight of the spatial decoupling re-identification branch, $F_{det}$ is the feature of the detection branch after spatial decoupling, $F_{id}$ is the feature of the re-identification branch after spatial decoupling, $Conv2d_0(\ )$ is the first convolution block, l and l' are integers from 1 to 3, $Conv2d_l(\ )$ is the second convolution block, the third convolution block or the fourth convolution block; $Conv2d'_0(\ )$ is the fifth convolution block, $Conv2d'_{l'}(\ )$ is the sixth convolution block, the seventh convolution block or the eighth convolution block.

9. The multi-target tracking method with joint detection and re-identification based on feature decoupling according to claim 8, wherein the total loss function $L_{total}$ used in the training of the detection branch module and the re-identification branch module is specifically:

$$L_{total} = \frac{1}{2}(e^{-w_1}(L_{heat} + L_{box}) + e^{-w_1}L_{id} + w_1 + w_2);$$

-continued $$L_{id} = -\sum_{k=1}^{K}\sum_{m=1}^{M} L^k(m)\log(p(m));$$

$$L_{box} = \sum_{k=1}^{K}\left(\left|o_k^t - \hat{o}_k^t\right| + \lambda_s \left|s_k^t - \hat{s}_k^t\right|\right);$$

$$L_{heat} = -\frac{1}{K}\sum_{x'y'}\left\{\begin{array}{ll}(1 - \hat{M}_{x'y'})^\alpha \log(\hat{M}_{x'y'}) & M_{x'y'} = 1;\\ (1 - M_{x'y'})^\beta(\hat{M}_{x'y'})^\alpha \log(1 - \hat{M}_{x'y'}) & M_{x'y'} \neq 1,\end{array}\right.$$

wherein $L_{heat}$ is the loss function of the heat map sub-branch sub-unit, $L_{id}$ is the loss function of the re-identification branch module, $L_{box}$ is the loss function of the center point offset sub-branch unit and the bounding box size sub-branch unit, $w_1$ and $w_2$ are learnable parameters, k is the target label in the t-th frame target image, K is the total number of targets in the t-th frame target image, M is the total number of target identity categories in the training set, m is the label of the target identity category in the training set, $L^k(m)$ is the k-th target identity vector in the t-th frame target image, p(m) is the target identity category distribution vector predicted by the re-identification branch module, $w_k^t$ is the true offset of the center point of the k-th target detection bounding box of the t-th frame target image, $$\hat{o}_k^t$$

is the predicted offset of the center point of the k-th target detection bounding box of the t-th frame target image, $\lambda_s$ is a preset constant, $$s_k^t$$

is the true size of the k-th target detection bounding box of the t-th frame target image, $$\hat{s}_k^t$$

is the predicted size of the k-th target detection bounding box of the t-th frame target image, (x', y') is a point in the heat map of $F_{det}$, $\hat{M}_{x'y'}$ is the heat map value corresponding to the midpoint (x', y') in the heat map of $F_{det}$ predicted by the heat map sub-branch unit, $M_{x'y'}$ is the heat map value corresponding to the midpoint (x', y') in the heat map of $F_{det}$, and $\alpha$ and $\beta$ are preset hyperparameters.

10. The multi-target tracking method with joint detection and re-identification based on feature decoupling according to claim 8, wherein the heat map value $M_{x'y'}$ is specifically:

$$M_{x'y'} = \sum_{k=1}^{K}\exp\left\{-\frac{(x' - c_{k,x}^{-t})^2 + (y' - c_{k,y}^{-t})^2}{2\sigma_c^2}\right\};$$

wherein $\sigma_c$ is a target scale adaptation standard deviation, $$(c_{k,x}^{-t}, c_{k,y}^{-t})$$

is the position of the center point of the k-th target detection bounding box of the t-th frame target image on the feature map.

11. The multi-target tracking method with joint detection and re-identification based on feature decoupling according to claim 3, wherein the multi-target tracking network in S2 comprises: a backbone network module, a feature decoupling module, a target detection branch module, a re-identification branch module;

the backbone network module is a DLA-34 network, which is used to obtain a feature F of the t-th frame target image;

the feature decoupling module comprises a channel decoupling unit and a spatial decoupling unit;

the channel decoupling unit is arranged to decouple the feature F in a channel dimension, and obtain a feature $F_{c\_det}$ for the detection branch after channel decoupling and the feature $F_{c\_id}$ for the re-identification branch after channel decoupling;

the spatial decoupling unit is used to decouple $F_{c\_det}$ and $F_{c\_id}$ in the spatial dimension respectively to obtain spatially decoupled features for detection branches $F_{det}$ and spatially decoupled features for re-identification branches $F_{id}$;

the target detection branch module comprises: a heat map sub-branch unit, a bounding box size sub-branch unit, and a center point offset sub-branch unit;

the heat map sub-branch unit comprises a seventh convolution sub-unit $Conv_5$;

the $Conv_5$ is used to adjust a dimension of the feature $F_{det}$ and generate the center point coordinates of the target detection bounding box;

the $Conv_5$ comprises: a 21st convolution layer of a 3×3 convolution kernel, a first ReLU activation function layer, and a 22nd convolution layer of a 1×1 convolution kernel;

the center point offset sub-branch unit comprises an eighth convolution sub-unit $Conv_6$;

the eighth convolution sub-unit $Conv_6$ is used to adjust the dimension of the feature $F_{det}$ to generate the offset of the center point of the target detection bounding box;

the eighth convolution sub-unit $Conv_6$ comprises: a 23rd convolution layer of the 3×3 convolution kernel, a ReLU activation function layer, and a 24th convolution layer of the 1×1 convolution kernel;

the bounding box size sub-branch unit comprises a ninth convolution sub-unit $Conv_7$;

the ninth convolution sub-unit $Conv_7$ is used to adjust the dimension of the feature $F_{det}$ to generate the width and height of the target detection bounding box;

the ninth convolution sub-unit $Conv_7$ comprises: a 25th convolution layer of the 3×3 convolution kernel, a ReLU activation function layer, and a 26th convolution layer of the 1×1 convolution kernel;

the re-identification branch module uses the feature $F_{id}$ to obtain every target identity vector in the target image;

the re-identification branch module comprises a tenth convolution sub-unit $Conv_8$;

the $Conv_8$ is used to adjust the dimension of $F_{id}$ to generate the target identity vector;

the tenth convolution subunit $Conv_8$ comprises: a 27th convolution layer of the 3×3 convolution kernel, a ReLU activation function layer, and a 28th convolution layer of the 1×1 convolution kernel.

12. The multi-target tracking method with joint detection and re-identification based on feature decoupling according to claim 11, wherein the channel decoupling unit comprises:

a maximum pooling layer sub-unit, an average pooling layer sub-unit, a first convolution sub-unit $Conv_1$, a second convolution sub-unit $Conv_2$, a first element summation sub-unit, a second element summation sub-unit, a first residual link sub-unit, and a second residual link sub-unit;

the maximum pooling layer sub-unit is arranged to perform a maximum pooling operation on the feature F;

the average pooling layer sub-unit is arranged to perform an average pooling operation on the feature F;

the first convolution sub-unit $Conv_1$ comprises: a 1st convolution layer, a 2nd convolution layer, and a ReLU activation function;

the first convolution sub-unit $Conv_1$ is arranged to aggregate the channel information of the detection task of the feature F after maximum pooling and average pooling;

the second convolution sub-unit $Conv_2$ comprises: a 3rd convolution layer, a 4th convolution layer, and a ReLU activation function;

the second convolution sub-unit $Conv_2$ is arranged to aggregate the channel information of the feature F after maximum pooling and average pooling for the re-identification task;

the first element summation sub-unit is arranged to sum, element by element, the features output by the first convolutional layer sub-unit and to process through the Sigmoid activation function to obtain a detection branch channel attention weight $C_{det}$;

the second element summation sub-unit is arranged to sum, element by element, the features output by the second convolutional layer sub-unit and to process through the Sigmoid activation function to obtain a re-identification branch channel attention weight $C_{id}$;

the first residual link sub-unit is arranged to multiply $C_{det}$ by the feature F and add the feature F to obtain a detection branch feature $F_{c\_det}$;

the second residual link sub-unit is arranged to multiply $C_{id}$ by the feature F and add the feature F to obtain a re-identification branch feature $F_{c\_id}$.

13. The multi-target tracking method with joint detection and re-identification based on feature decoupling according to claim 12, wherein the feature $F_{c\_det}$ for the detection branch after channel decoupling and the feature $F_{c\_id}$ for the re-identification branch after channel decoupling are:

$$F_{c\_det} = F * C_{det} + F;$$

$$F_{c\_id} = F * C_{id} + F;$$

$$C_{det} = \sigma(Conv_1(AvgPool(F)) + Conv_1(MaxPool(F)));$$

$$C_{id} = \sigma(Conv_2(AvgPool(F)) + Conv_2(MaxPool(F)));$$

wherein $C_{det}$ is the detection branch channel attention weight, $C_{id}$ is the re-identification branch channel attention weight, $F_{c\_det}$ is the channel decoupled feature to be used for the detection branch, $F_{c\_id}$ is the channel decoupled feature to be used for the re-identification branch, $\sigma$ is the Sigmoid activation function, $Conv_1$ is the first convolution sub-unit, $Conv_2$ is the second convolution sub-unit, AvgPool( ) is the average pooling operation, and MaxPool( ) is the maximum pooling operation.

14. The multi-target tracking method with joint detection and re-identification based on feature decoupling according to claim 13, wherein the spatial decoupling unit comprises a third convolution sub-unit $Conv_3$, a fourth convolution sub-unit $Conv_4$, a fifth convolution sub-unit, a sixth convolution sub-unit, a third element summation sub-unit, a fourth element summation sub-unit, a third residual link sub-unit, and a fourth residual link sub-unit;

the third convolution sub-unit $Conv_3$ comprises a 5th convolution layer of the 1×1 convolution kernel, a GELU activation function, and an input of the third convolution layer sub-unit as the feature $F_{c\_det}$;

the fourth convolution sub-unit $Conv_4$ comprises a 6th convolution layer of the 1×1 convolution kernel, a GELU activation function, and an input of the fourth convolution layer sub-unit as the feature $F_{c\_id}$;

the fifth convolution sub-unit comprises a first convolution block $Conv2d_0$, a second convolution block $Conv2d_1$, a third convolution block $Conv2d_2$, and a fourth convolution block $Conv2d_3$; an input of the fifth convolution sub-unit is an output of the third convolution sub-unit;

the first convolution block $Conv2d_0$ is a 7th convolution layer of a 5×5 convolution kernel; an input of the first convolution block is an output of the third convolution sub-unit;

the second convolution block $Conv2d_1$ comprises a 8th convolution layer of a 1×7 convolution kernel and a 9th convolution layer of a 7×1 convolution kernel, wherein an output of the 8th convolution layer is an input of the 9th convolution layer;

the third convolution block $Conv2d_2$ comprises a 10th convolution layer of a 1×11 convolution kernel and a 11th convolution layer of a 11×1 convolution kernel, wherein an output of the 10th convolution layer is an input of the 11th convolution layer;

the fourth convolution block $Conv2d_3$ comprises a 12th convolution layer of a 1×21 convolution kernel and a 13th convolution layer of a 21×1 convolution kernel, wherein an output of the 12th convolution layer is an input of the 13th convolution layer;

the inputs of the second convolution block $Conv2d_1$, the third convolution block $Conv2d_2$, and the fourth convolution block $Conv2d_3$ are all output of the first convolution block $Conv2d_0$;

the sixth convolution sub-unit comprises a fifth convolution block $Conv2d'_0$, a sixth convolution block $Conv2d'_1$, a seventh convolution block $Conv2d'_2$, and an eighth convolution block $Conv2d'_3$; an input of the sixth convolution sub-unit is an output of the fourth convolution sub-unit;

the fifth convolution block $Conv2d'_0$ is a 14th convolution layer of a 5×5 convolution kernel; an input of the fifth convolution block is an output of the fourth convolution sub-unit;

the sixth convolution block $Conv2d'_1$ comprises a 15th convolution layer of a 1×3 convolution kernel and a 16th convolution layer of a 3×1 convolution kernel, wherein an output of the 15th convolution layer is an input of the 16th convolution layer;

the seventh convolution block $Conv2d'_2$ comprises a 17th convolution layer of a 1×5 convolution kernel and a 18th convolution layer of a 5×1 convolution kernel, wherein an output of the 17th convolution layer is an input of the 18th convolution layer;

the eighth convolution block $Conv2d'_3$ comprises a 19th convolution layer of a 1×9 convolution kernel and a 20th convolution layer of a 9×1 convolution kernel, wherein an output of the 19th convolution layer is an input of the 20th convolution layer;

the inputs of the sixth convolution block Conv2d'$_1$, and the seventh convolution block Conv2d'$_2$ and the eighth convolution block Conv2d'$_3$ are all output of the fifth convolution block Conv2d'$_0$;

the third element summation sub-unit is arranged to sum, element by element, the features output by the first convolution block Conv2d$_0$, the second convolution block Conv2d$_1$, the third convolution block Conv2d$_2$, and the fourth convolution block Conv2d$_3$ and the summation result is activated by the Sigmoid function to obtain a spatial attention weight $S_{det}$ of the spatial decoupling detection branch;

the fourth element summation sub-unit is arranged to sum, element by element, the features output by the fifth convolution block Conv2d'$_0$, the sixth convolution block Conv2d'$_1$, the seventh convolution block Conv2d'$_2$ and the eighth convolution block Conv2d'$_3$ and the summation result is activated by the Sigmoid function to obtain a spatial attention weight $S_{id}$ of the spatial decoupling re-identification branch;

the third residual link sub-unit is arranged to multiply $S_{det}$ by the feature $F_{c\_det}$ and to add the feature $F_{c\_det}$ to obtain a feature $F_{det}$ for the detection branch after spatial decoupling; and the second residual link sub-unit is arranged to multiply $S_{id}$ by the feature $F_{c\_id}$ and to add the feature $F_{c\_id}$ to obtain a feature $F_{id}$ for the re-identification branch after spatial decoupling.

15. The multi-target tracking method with joint detection and re-identification based on feature decoupling according to claim 14, wherein the feature $F_{det}$ for the detection branch after spatial decoupling and the feature $F_{id}$ for the re-identification branch after spatial decoupling are obtained based on:

$$F_{det} = F_{c\_det} * S_{det} + F_{c\_det};$$

$$F_{id} = F_{c\_id} * S_{id} + F_{c\_id};$$

$$S_{det} = \sigma\left(Conv2d_0(Conv_3(F_{c\_det})) + \sum_{l=1}^{3} Conv2d_l(Conv2d_0(Conv_3(F_{c\_det})))\right);$$

$$S_{id} = \sigma\left(Conv2d'_0(Conv_4(F_{c\_id})) + \sum_{l'=1}^{3} Conv2d'_{l'}(Conv2d'_0(Conv_4(F_{c\_id})))\right);$$

wherein $F_{c\_det}$ is the feature of the detection branch after channel decoupling, $F_{c\_id}$ is the feature of the re-identification branch after channel decoupling, $S_{det}$ is the spatial attention weight of the spatial decoupling detection branch, $S_{id}$ is the spatial attention weight of the spatial decoupling re-identification branch, $F_{det}$ is the feature of the detection branch after spatial decoupling, $F_{id}$ is the feature of the re-identification branch after spatial decoupling, Conv2d$_0$( ) is the first convolution block, $1$ and $1'$ are integers from 1 to 3, Conv2d$_l$( ) is the second convolution block, the third convolution block or the fourth convolution block; Conv2d'$_0$( ) is the fifth convolution block, Conv2d'$_{l'}$( ) is the sixth convolution block, the seventh convolution block or the eighth convolution block.

16. The multi-target tracking method with joint detection and re-identification based on feature decoupling according to claim 15, wherein the total loss function $L_{total}$ used in the training of the detection branch module and the re-identification branch module is specifically:

$$L_{total} = \frac{1}{2}(e^{-w_1}(L_{heat} + L_{box}) + e^{-w_1}L_{id} + w_1 + w_2);$$

$$L_{id} = -\sum_{k=1}^{K}\sum_{m=1}^{M}L^k(m)\log(p(m));$$

$$L_{box} = \sum_{k=1}^{K}(|o_k^t - \hat{o}_k^t| + \lambda_s|s_k^t - \hat{s}_k^t|);$$

$$L_{heat} = -\frac{1}{K}\sum_{x'y'}\begin{cases}(1-\hat{M}_{x'y'})^\alpha\log(\hat{M}_{x'y'}) & M_{x'y'} = 1;\\(1-M_{x'y'})^\beta(\hat{M}_{x'y'})^\alpha\log(1-\hat{M}_{x'y'}) & M_{x'y'} \neq 1,\end{cases}$$

wherein $L_{heat}$ is the loss function of the heat map sub-branch sub-unit, $L_{id}$ is the loss function of the re-identification branch module, $L_{box}$ is the loss function of the center point offset sub-branch unit and the bounding box size sub-branch unit, $w_1$ and $w_2$ are learnable parameters, k is the target label in the t-th frame target image, K is the total number of targets in the t-th frame target image, M is the total number of target identity categories in the training set, m is the label of the target identity category in the training set, $L^k(m)$ is the k-th target identity vector in the t-th frame target image, p(m) is the target identity category distribution vector predicted by the re-identification branch module, $$o_k^t$$

is the true offset of the center point of the k-th target detection bounding box of the t-th frame target image, $$\hat{o}_k^t$$

is the predicted offset of the center point of the k-th target detection bounding box of the t-th frame target image, $\lambda_s$ is a preset constant, $$s_k^t$$

is the true size of the k-th target detection bounding box of the t-th frame target image, $$\hat{s}_k^t$$

is the predicted size of the k-th target detection bounding box of the t-th frame target image, (x', y') is a point in the heat map of $F_{det}$, $\hat{M}_{x'y'}$ is the heat map value corresponding to the midpoint (x', y') in the heat map of $F_{det}$ predicted by the heat map sub-branch unit, $M_{x'y'}$ is the heat map value corresponding to the midpoint (x', y') in the heat map of $F_{det}$, and $\alpha$ and $\beta$ are preset hyperparameters.

17. The multi-target tracking method with joint detection and re-identification based on feature decoupling according to claim 16, wherein the heat map value $M_{x'y'}$ is specifically:

$$M_{x'y'} = \sum_{k=1}^{K} \exp\left\{-\frac{\left(x' - c_{k,x}^{-t}\right)^2 + \left(y' - c_{k,y}^{-t}\right)^2}{2\sigma_c^2}\right\};$$

5 wherein $\sigma_c$ is a target scale adaptation standard deviation, $$\left(c_{k,x}^{-t}, c_{k,y}^{-t}\right)$$

10 is the position of the center point of the k-th target detection bounding box of the t-th frame target image on the feature map.

\* \* \* \* \*